US006801641B2

(12) United States Patent
Eraslan

(10) Patent No.: US 6,801,641 B2
(45) Date of Patent: Oct. 5, 2004

(54) THREE DIMENSIONAL FACE IDENTIFICATION SYSTEM

(75) Inventor: Arsev H. Eraslan, Wheeling, WV (US)

(73) Assignee: Wheeling Jesuit University, Wheeling, WV (US)

( * ) Notice: Subject to any disclaimer, the term of this patent is extended or adjusted under 35 U.S.C. 154(b) by 0 days.

(21) Appl. No.: 10/066,557

(22) Filed: Feb. 6, 2002

(65) Prior Publication Data

US 2002/0122573 A1 Sep. 5, 2002

Related U.S. Application Data

(63) Continuation of application No. 09/203,683, filed on Dec. 1, 1998, now Pat. No. 6,381,346.
(60) Provisional application No. 60/067,065, filed on Dec. 1, 1997.

(51) Int. Cl.[7] .................................................. C06K 9/00
(52) U.S. Cl. ....................... 382/118; 382/190; 382/285; 345/420; 345/679
(58) Field of Search ............................... 382/118, 190, 382/154, 100, 254, 199, 286, 285, 305; 345/420, 49, 679

(56) References Cited

U.S. PATENT DOCUMENTS

| 4,754,487 A | * | 6/1988 | Newmuis ..................... 382/118 |
| 5,031,228 A | | 7/1991 | Lu |
| 5,432,864 A | | 7/1995 | Lu et al. |
| 5,659,625 A | | 8/1997 | Marquardt |
| 5,764,790 A | | 6/1998 | Brunelli et al. |
| 5,781,367 A | | 7/1998 | Searle et al. |
| 5,905,807 A | | 5/1999 | Kado et al. |
| 5,974,150 A | | 10/1999 | Kaish et al. |
| 5,982,912 A | * | 11/1999 | Fukui et al. ................. 382/118 |
| 6,047,078 A | | 4/2000 | Kang |
| 6,091,836 A | | 7/2000 | Takano et al. |
| 6,173,068 B1 | | 1/2001 | Prokoski |
| 6,381,346 B1 | * | 4/2002 | Eraslan ........................ 382/118 |
| 6,430,306 B2 | * | 8/2002 | Slocum et al. ............... 382/115 |

OTHER PUBLICATIONS

Wayne Niblack et al. "Storage and Retrieval for Image and Video Databases II", Feb. 7–8, 1994, SPIE the international Society for Optical Engineering, vol. 2185, pp. 34–46.*

* cited by examiner

Primary Examiner—Bhavesh M. Mehta
Assistant Examiner—Sheela C. Chawan
(74) Attorney, Agent, or Firm—Nixon & Vanderhye, P.C.

(57) ABSTRACT

A three-dimensional (3-D) facial imaging system is disclosed for generating facial images, indexing those images by composite codes and for searching for similar two-dimensional (2-D) facial images. The 3-D images of human faces are generated from a data repository of 3-D facial feature surface shapes. These shapes are organized by facial feature parts. By assembling a shape for each facial part is assembled, a 3-D facial image is formed. Human facial images may be represented with a composite code (facial feature part code and shape code). A 3-D image of any face may be generated using the code to select the proper facial feature shapes from the stored repository of shapes.

18 Claims, 34 Drawing Sheets

Face-Attribute Index: 01 (Nose)
Face-Feature-Surface Code: 142 (10001110)

Left-Profile View  Frontal View  Right-Profile View

Left-Upward-Angled View  Right-Downward-Angled View

Face-Attribute Index: 01 (Nose)
Face-Feature-Surface Code: 142 (10001110)

FIG. 12
Face-Attribute Index i: 04 (Chin)
Face-Feature-Surface Code j:  Left-Profile   Left-Angled   Frontal   Right-Angled   Right-Profile
001 (00000001)
082 (01010010)
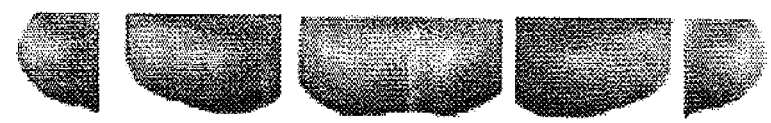
255 (11111111)

FIG. 14

| Face-Feature Part | Face-Feature-Part Index | Face-Feature Surface Code (binary) |
|---|---|---|
| Nose | 01 | 001(00000001-255(11111111) |
| Upper Lip | 02 | 001(00000001-255(11111111) |
| Lower Lip | 03 | 001(00000001-255(11111111) |
| Chin | 04 | 001(00000001-255(11111111) |
| Left-Eye Socket | 05 | 001(00000001-255(11111111) |
| Right-Eye Socket | 06 | 001(00000001-255(11111111) |
| Left Eyebrow | 07 | 001(00000001-255(11111111) |
| Right Eyebrow | 08 | 001(00000001-255(11111111) |
| Left Eyeball | 09 | 001(00000001-255(11111111) |
| Right Eyeball | 10 | 001(00000001-255(11111111) |
| Left Cheek | 11 | 001(00000001-255(11111111) |
| Right Cheek | 12 | 001(00000001-255(11111111) |
| Left Ear | 13 | 001(00000001-255(11111111) |
| Right Ear | 14 | 001(00000001-255(11111111) |
| Left Jaw | 15 | 001(00000001-255(11111111) |
| Right Jaw | 16 | 001(00000001-255(11111111) |
| Left Side | 17 | 001(00000001-255(11111111) |
| Right Side | 18 | 001(00000001-255(11111111) |
| Left Temple | 19 | 001(00000001-255(11111111) |
| Right Temple | 20 | 001(00000001-255(11111111)  ⎫ 1402 |
| Forehead | 21 | 001(00000001-255(11111111) |
| Back Head | 22 | 001(00000001-255(11111111) |
| Head Top | 23 | 001(00000001-255(11111111)  ⎫ 1402 |

1400

Frontal View (with Right-Tilt Angle: ~ -05 degree)

Face-Attribute Index: 01 (Nose)
Face-Feature-Surface Code: 090 (01011010)

FIG. 16
Frontal View (with Right-Tilt Angle: ~ -05 degree)
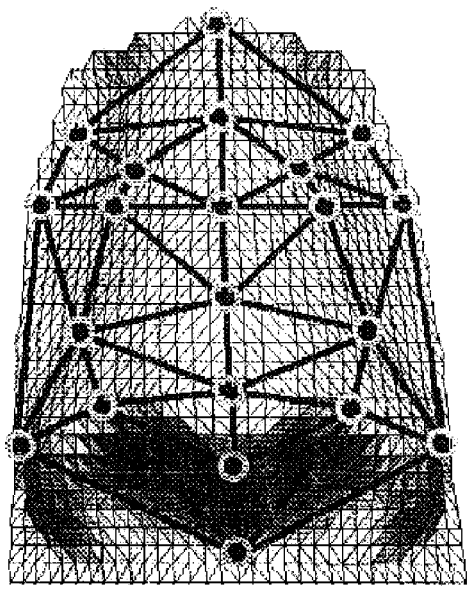 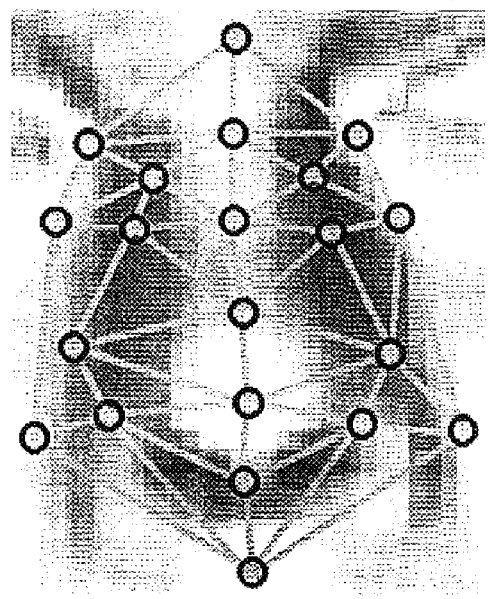
Face-Attribute Index: 01 (Nose)
Face-Feature-Surface Code: 090 (01011010)

Right-Profile View

Face-Attribute Index: 01 (Nose)
Face-Feature-Surface Code: 090 (01011010)

FIG. 18
Right-Profile View
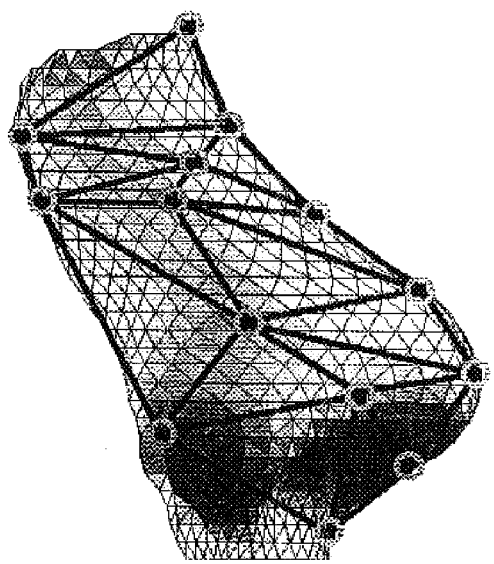 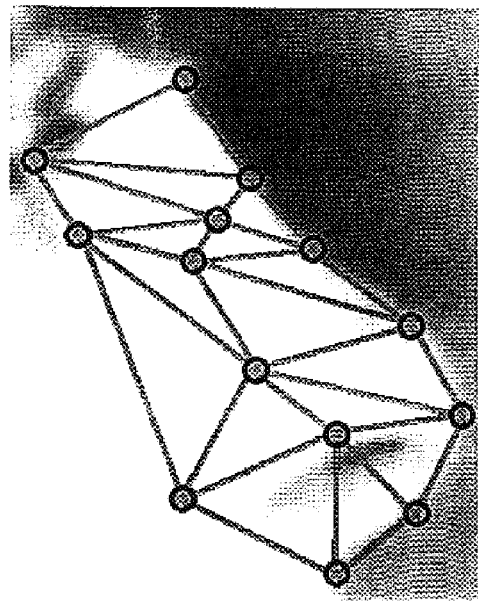
Face-Attribute Index: 01 (Nose)
Face-Feature-Surface Code: 090 (01011010)

Frontal View (with Right-Tilt Angle: ~ -05 degree)

Face-Attribute Index: 13 (Left-Ear)
Face-Feature-Surface Code: 127 (01111111)

Right-Profile View

Face-Attribute Index: 14 (Right-Ear)
Face-Feature-Surface Code: 101 (01100101)

FIG. 21
Frontal View (with Right-Tilt Angle: ~ -05 degree)
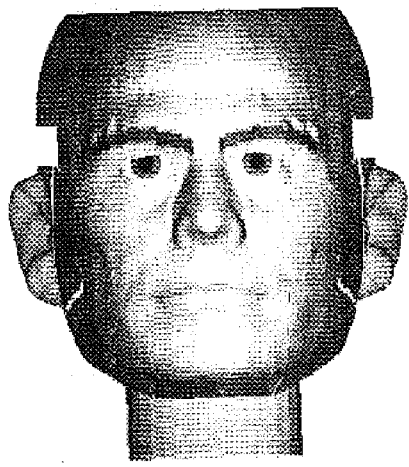 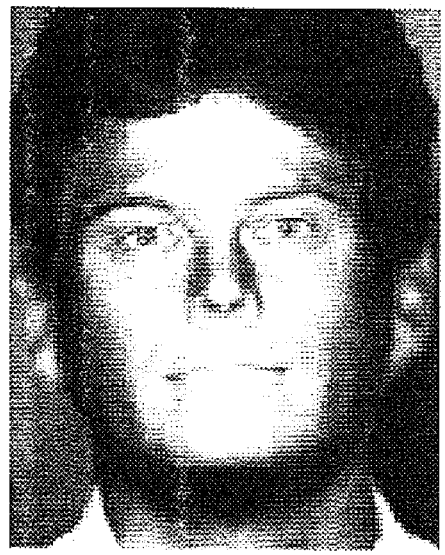
Partial Face (Head)-Composite

FIG. 22
Right-Profile View
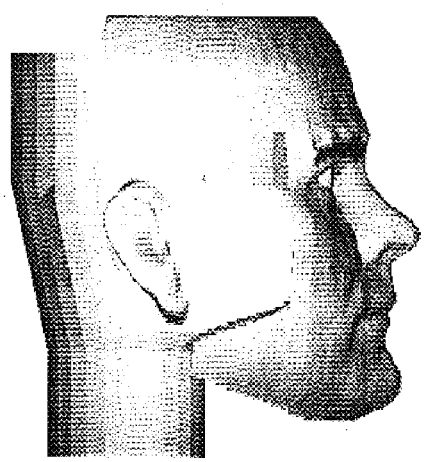
Partial Face (Head)-Composite

FIG. 23
Frontal View (with Right-Tilt Angle: ~ -05 degree)
 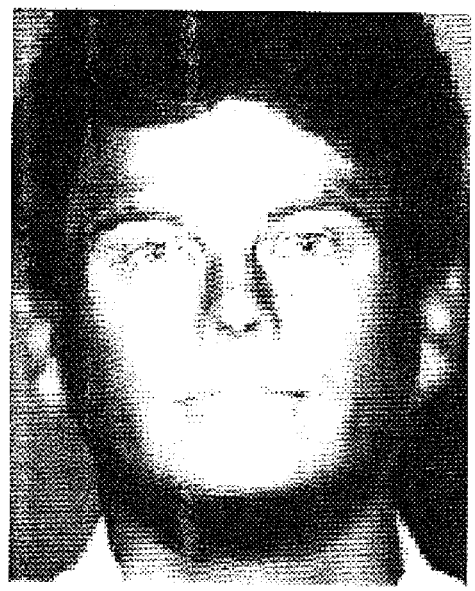
Complete Face (Head)-Composite

FIG. 24
Right-Profile View
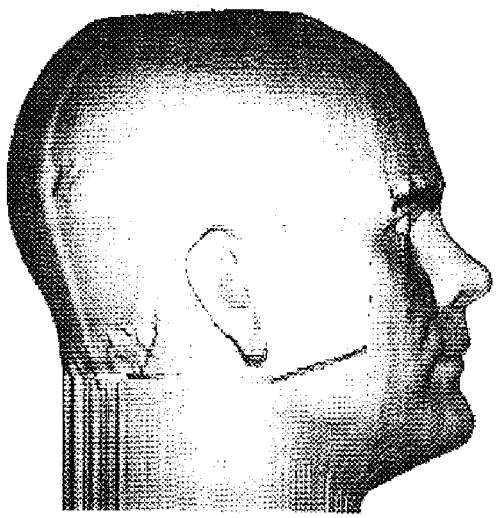
Complete Face (Head)-Composite

FIG. 27
Left-Angled View (~30 degree)
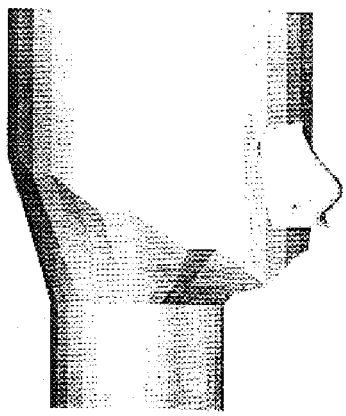
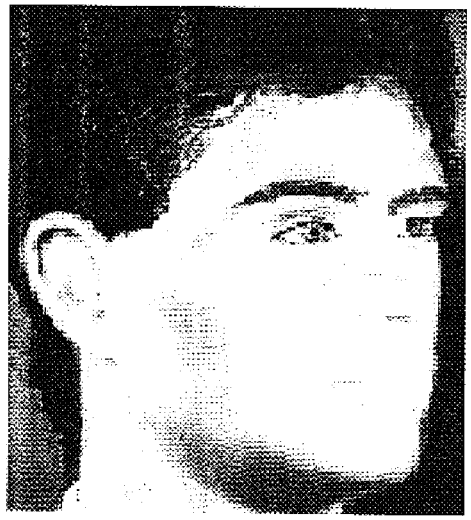
Face-Attribute Index: 01 (Nose)
Face-Feature-Surface Code: 090 (01011010)

Left-Angled View (~30 degree)

Face-Attribute Index: 01 (Nose)
Face-Feature-Surface Code: 090 (01011010)

FIG. 29
Left-Angled View (~30 degree)
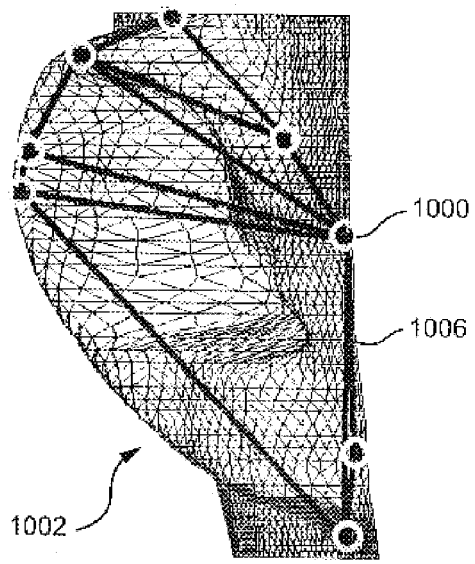
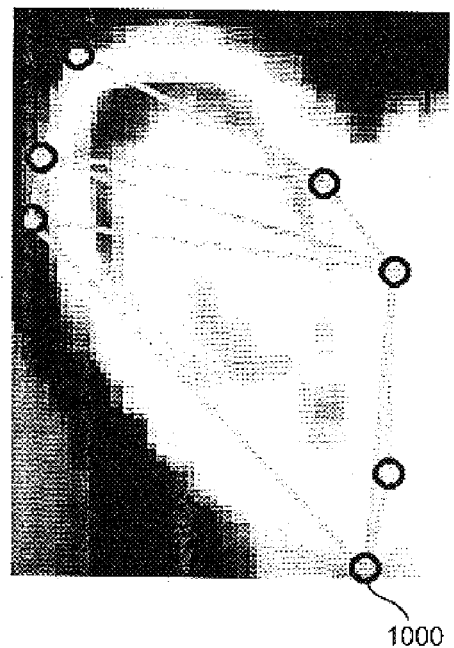
Face-Attribute Index: 14 (Right-Ear)
Face-Feature-Surface Code: 101 (01100101)

FIG. 30
Left-Angled View (~30 degree)
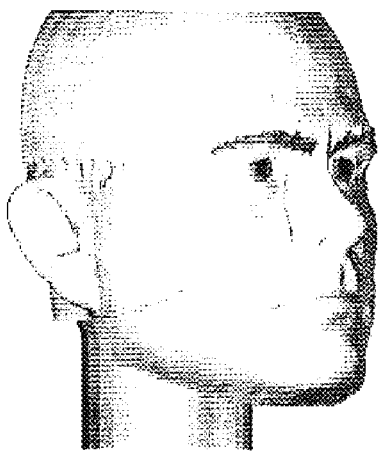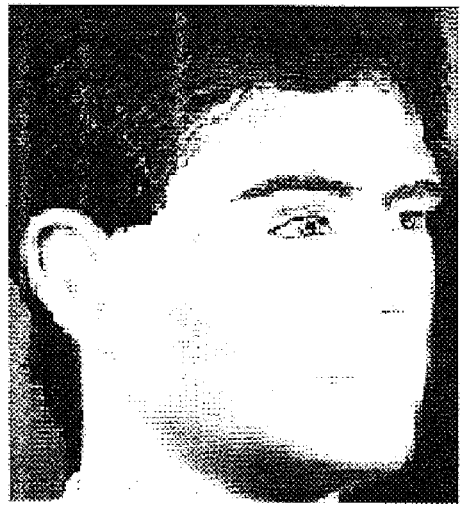
Partial Face (Head)-Composite

FIG. 31
Left-Angled View (~30 degree)
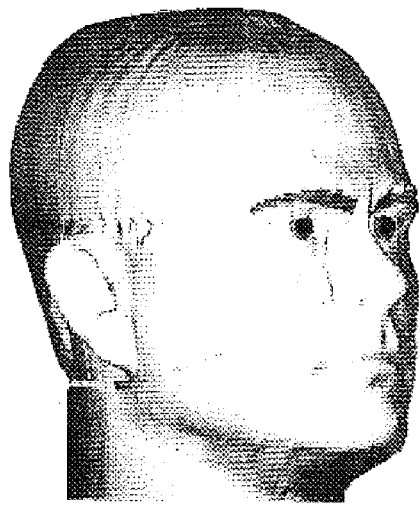 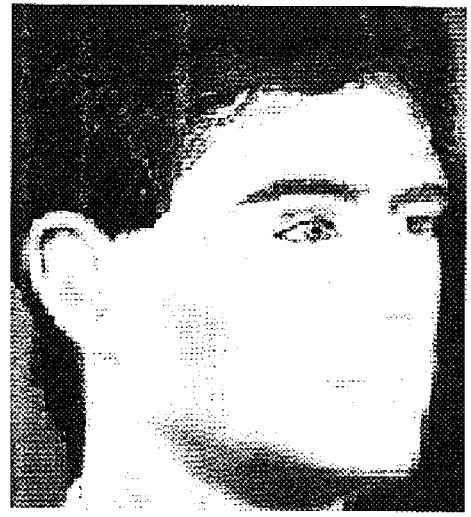
Complete Face (Head)-Composite

THREE DIMENSIONAL FACE IDENTIFICATION SYSTEM

This is a continuation of Ser. No. 09/203,683 filed on Dec. 1, 1998 now U.S. Pat. No. 6,381,346.

Applicant's provisional application entitled "Integrated Law-Enforcement Face-Identification System", U.S. Ser. No. 60/067,065 and filed Dec. 1, 1997, is a related application and is incorporated by reference in its entirety.

FIELD OF THE INVENTION

This invention relates to the field of face recognition, and, in particular, to face-identification for law-enforcement and corrections applications.

BACKGROUND OF THE INVENTION

Law enforcement organizations rely heavily on witnesses to a crime for purposes of identifying criminals based on pictures of the criminal. Typically, a witness will review pages and pages of "mug shots" of criminals from books of mug shots maintained by the law enforcement organization. The witness hopefully recognizes the criminal from the mug shots.

Over the years, huge collections of mug shots have been developed by local, state and federal law enforcement agencies. Some of these collections of mug shots have been deposited in a national depository for mug shots maintained by the Federal Bureau of Investigation (FBI) of the U.S. Department of Justice. It is estimated that in the United States there are approximately 60 million mug shots in various mug shot collections across the country. However, the FBI has only about one-third of all U.S. mug shots in its own collection.

Mug shots are typically a frontal and profile views of an individual. A mug shot usually comprises two photographs of the front and side view of the face of an individual. To provide standardization of mug shots, law enforcement photographers follow specific guidelines on the positioning of the front view and side views of a person for photographing mug shots. Accordingly, each pair of mug shots, i.e., the front face and side face views, is uniform with respect to angle of view, distance and lighting of the person being photographed. These mug shots have been stored in photographic books, on film, on tape and now digitally on computer discs.

Mug shots show only two views of an individual—the front face view and a profile face view. To recognize an individual suspect from mug shots, a witness must recognize the front face or profile view of the individual. However, the witness may not have seen the suspect from the front or profile view. Rather, the witness may have seen an angled view of the suspect's face, such as from above, below or to one side. The view that the witness sees at a crime scene is often different than the front or profile view shown in mug shots. For a witness to recognize a suspect by reviewing the mug shots, the witness must convert in his own mind the angle from which he saw the suspect to either or both a front face or side view of the individual as shown in the mug shots. Not all witnesses can reliably convert in their mind the view actually seen of the suspect to the front face or side views shown in mug shots. Because all witnesses cannot make this conversion, witnesses from time to time have not been able to identify suspects. Moreover, witnesses at criminal trials are subject to cross-examination about how they recognized a suspect based on the frontal or profile view shown in a mug shot when the witness never saw the suspect from those particular views. Accordingly, criminals have not been identified or have been acquitted at trial because the witness did not reliably recognize the criminal suspect when reviewing mug shots, or because the witness was effectively cross-examined at trial with respect to the view that he had of the suspect.

There are many other facial features that are more difficult to describe and identify, such as the size of a person's nose, description of their face, etc. These other facial features are often recalled and described by witnesses to a crime, and can be used to recognize a suspect. However, these other facial features are not easily categorized and, thus, have prevented the creation of an effective system for categorizing or indexing mug shots. In the past, law enforcement investigators have attempted to characterize facial features. For example, law enforcement organizations have created standard measurement tools for identifying the size of person's eyes, nose, mouth, facial structure and ears. The criteria that are used are primarily used for identifying mug shots are limited 2-D criteria based on a full frontal view or profile view of a face. For example, the criteria as to nose width and eye shape may be limited to just front view figures, and not to profile views. Similarly, ear shape criteria may be applicable only to profile views and not to frontal view pictures of the individual. Thus, these criteria are of limited use at best if the witness observed an individual from a perspective other than a frontal or profile perspective.

Prior to the present invention, no known techniques were used for indexing facial features based on three-dimensional (3-D) framework. Prior approaches to cataloging and indexing facial features have assumed that the faces are shown only in 2-D full frontal and/or profiled views such as in mug shots. These indices of profile and frontal views of mug shots are helpful in identifying suspects when a front face or profile face view is available of the suspect. For example, if the suspect looks straight into a security camera such that there is a front face image, then that front face image can be indexed using standard face indices. Using the indices of the security camera picture of the suspect, the indicie values can be used to identify mug shot pictures having the same indicie values in searching for the criminal. Similarly, if a witness working with a law enforcement sketch artist can generate a frontal face and/or profile view of a suspect, that frontal face and profile sketch can be used to categorize the facial values of the criminal. These facial values can also be used to access the mug shots which are by the facial values indices used to obtain those mug shots having the same facial value indices.

The indices of facial features used to index mug shots are not useful when a frontal face or profile picture or sketch of the perpetrator is unavailable. Side views of a suspect cannot be readily categorized by facial indexing used with the current mug shots. A side view picture of a criminal is not susceptible to identifying the facial feature values used with current indices of mug shots. Unfortunately, the majority of photographs taken of suspects by security cameras are of angled views of the suspect's face other than frontal face or profile. Thus, when a security camera captures on film a suspect, often that picture cannot be directly used to identify the suspect by mug shots.

It has been long recognized to be an undesirable trait that the mug shot indices do not allow for correlation with pictures of criminals other than straight front or straight profile views. It is a long-felt need in law enforcement to have a computerized system for recognizing faces in which a photograph or other 2-D image of a criminal from any view can be quickly and reliably analyzed and compared to a mug shot collection to select those mug shots of possible perpetrators of a crime.

SUMMARY OF THE INVENTION

The present invention is a three-dimensional (3-D) face-identification system useful for human faces and other image identification applications. The invention also provides a fast search engine for searching a large collection of two-dimensional mug shot photographs for those that match a particular facial image. In addition, the invention provides a technique for indexing 2-D mug shots to a uniform set of 3-D facial feature parts, such that a 3-D face surface images are generated based on the 2-D mug shots. Moreover, the invention provides a method by which a large number of mug shots may be reproduced using 3-D face surfaces by reference only to the uniform set of 3-D facial surface features and a composite code that identifies the facial feature parts to be used to generate a particular individual's facial image. This method avoids the need to locally store a large amount of data that would be required if every mug shot were stored locally. In addition, the invention has the advantage of generating a 3-D facial image from any desired point of view, and of providing a searchable code to 2-D mug shot photographs from a 3-D image reconstruction of a face.

The present invention provides three-dimensional face-identification system which incorporates facial fiducial values (points). These fiducial values are used to index a facial image determining the composite code for the image. The composite code is used to regenerate the facial image from a group of standard facial feature parts. The present invention allows facial fiducial values to be measured from any photograph, sketch or picture of an individual's face from any viewpoint. For example, a photograph of the face of a suspect from the perspective of 45° off to the side of the suspect. The photograph is analyzed to determine its facial fiducial values corresponding to a three-dimensional (3-D) model of the face. Once these facial fiducial values are obtained with respect to a three-dimensional model, they are used to determine the proper composite codes for the 3-D facial image. These composite codes correspond to a facial feature parts database. Thus, the suspect's 3-D face can now be generated using only the composite code and facial feature parts. In addition, the composite codes correspond to composite codes that index the two-dimensional mug shot photos. Thus, existing mug shot directories can be quickly searched by finding mug shots that have similar composite codes to the composite code for the face of the suspect to select mug shots of possible perpetrators. The selected mug shots are then accessed, preferably by a computer system and displayed on a computer screen to the witness.

In addition, the invention is able to convert the two-dimensional mug shot photos to a three-dimensional image. This three-dimensional image (shown as a 2-D display image), can be rotated automatically or manually by the viewer to a viewpoint that corresponds to the view that the witness had of the suspect. Moreover, the facial image shown on a display can be rotated to the viewpoint corresponding to the viewpoint of a suspect taken by a security camera or other photographic or video device. In this manner, more reliable and faster identification of suspects can be accomplished using standard two-dimensional mug shots that are selected using three-dimensional imaging fiducial feature points and composite codes. The face-recognition technology of the invention is based on a completely three-dimensional (3-D) framework. This critically-important approach of the invention is conceptually different from all existing face-recognition technologies. The invention completely adheres to the fact that naturally 3-D surfaces, which include 3-D face (head) surfaces, cannot be compared in different angled-view pauses based on two-dimensional (2-D) planar images, including the 2-D face images as frontal-view and profile-view mug shots.

Therefore, the invention establishes its 3-D framework based on 3-D face (head) surfaces 102, 104 (FIG. 1), which are subsequently used to establish the face-feature surfaces of the face-feature parts. The invention uses the available laser-scanner data for 3-D head surfaces (e.g., data generated by CARD Laboratory of Wright Patterson Air Force Base, U.S. Air Force). The available data for the 3-D head surfaces is used to generate the required 3-D surface mesh (grid/panel) structures 202 which can be considered in high-resolution 204 (FIG. 2), intermediate resolution 302 (FIG. 3) and low-resolution 402 (FIG. 4) formats for rendering 3-D twenty-four (24)-bit color image of facial and head surfaces.

The invention uses data for 3-D head surfaces (i.e., for more than 2000 humans) to establish a face-feature-surface repository. The invention identifies on each available 3-D head surface, up to thirty-two (32) face-feature parts 502 and separates their associated 3-D face (head) feature surfaces 504. The invention associates an "index i" to each face (head) feature part 502 (e.g., nose as i=1, upper-lip as i-2, lower-lip as i=3, chin as i=4, etc.) to establish the required computer bookkeeping or indexing procedure. The invention considers the 3-D head-surface data for each different head; and by separating the face (head)-feature parts 502 for each head surface image, a computer generates a complete set of different face (head) feature surfaces 504 to form a repositgory of face feature surfaces.

The invention considers up to two-hundred fifty-six (256) different face-feature surfaces for each one of the designated facefeature part (i). Therefore, for each of the designated face-feature parts "i" (e.g., nose, upper lip, lower lip, chin, left eye, right eye, etc.), the invention establishes up to 256 face-feature surfaces for each part by using the available laser-scanned 3-D head-surface data of up to 2000 heads. Conventional geometrical clustering techniques are used to categorize up to 256 distinct face-feature surfaces 504 for each designated face-feature part "i", from up to 2000 face-feature surfaces obtained from the available laser-scanned 3-D head-surface data.

To each categorized, distinctly-different face-feature surface 504 of the designated face-feature 502 (part i), the invention assigns a face-feature-surface code "j", which is associated with all of its known geometrical and surface-color/complexion characteristics. Therefore, for computer bookkeeping purposes, the invention establishes a completely 3-D framework, based on a set of "indices i", which identify the designated face-feature parts, and subsets of "codes j", for the face-feature surfaces, such that for any specified face-feature index i and the face-feature-surface code j, the invention can provide a completely 3-D, color face-feature surface, which can be rendered graphically in the frontal view, left-profile view, right-profile view and in all possible angled-view for observation and analysis.

Based on the results of its geometrical clustering analysis, the invention considers sets of face-feature-surface codes j, which contain low-numbered codes, starting with one (1) for the most common face-feature surfaces, and high-numbered codes, ending with two-hundred fifty-five (255), for the least-common (generally most prominent) face-feature surfaces. Fewer than 256 face-feature surfaces may be used for each face-feature part. For example, sixteen (16) face feature surfaces may be used for each face-feature part.

The invention considers, currently sixty-four (64), or as required up to one-hundred twenty-eight (128) face attributes, which include the designated, up to 32, face-feature parts. FIGS. 5 and 6 show some exemplary face and head feature parts 502. The invention uses the additional face attributes for considering such features as: (a) additional geometrical information (e.g., relative distances between the face-feature surfaces) of the face-feature parts; (b) color, tone, complexion, texture conditions of the face surfaces; (c) facial hair; d) abnormal characteristics as scars, bone damage, etc., and (e) other features.

The invention maintains, for each face-feature surface (with code j) of each face-feature part (with index i), a 3-D high-resolution (FIG. 2) surface mesh (vertex/panel structure) with 24-bit color information (FIG. 8) for graphically rendering 3-D face (head) surfaces. In order to further simplify the geometrical comparisons of different face-feature surfaces, the invention considers, for each face-feature part, a set of selected fudicial points which represent readily-identifiable characteristics locations on its face-feature surface. As an example, for the nose part, as the face-feature part with index i one (1), the invention considers twenty-one (21) points, including the top point, bottom point, tip point, nostril-side points, top-flare points, half point, quarter points, etc. (FIG. (9). The sets of fiducial points collectively guarantee that two nose-surface with matching sets of fiducial points, also match geometrically, within the limits of human perception and machine intelligence. As another example, for the ear parts, i.e., left ear, with index i as thirteen (13) and right ear with index i as fourteen (14), it considers eight (8) points, including the tragion points, maximum-back point, maximum-outward point, etc. (FIG. 10), which allows the invention to incorporate the geometrically-important characteristics of the ears in its 3-D face-recognition technology.

The invention considers the use of fiducial points with two novel conceptual and implementation features, that are uniquely different from all existing 2-D face-recognition technologies. First, the invention considers the sets of fiducial points, in the sense as fiducial templates, for all the face-feature parts, in contrast to the whole 2-D face image (or slightly distorted 2-D face images), associated with conventional 2-D face-recognition technologies. Second, the invention considers completely 3-D positions for the fiducial points, in contrast to the 2-D positions used in conventional 2-D face-recognition technologies. Therefore, the invention, by considering the completely 3-D structure of the sets of fiducial points (i.e., fiducial template) can generate correctly all the 2-D structures of the fiducial points on planes normal to the direction of line of sight to the face (head) for all angled-view observations.

The invention considers up to 256 3-D face-feature surfaces, identified by their "codes j" or each of the 64 face-feature parts, designated by its "index i". For each face-feature part, e.g., nose with i as 1 (FIG. 11), chin, with i as 4 (FIG. 12), left/right ears, with i as 13 and 14, respectively (FIG. 13), the framework of the invention provides all the associated 2-D images of the 3-D face-feature surface as observed from any specified view, including the frontal view, left/right-profile view, and any left/right- and upward/downward-angled view. Therefore, the 3-D framework of the invention, which is based on 3-D face (head)-feature surfaces, can completely eliminate the geometrical problems associated with angled-view observations, as encountered in currently-available 2-D face-recognition technologies.

The invention uses its 3-D framework, based on face-feature parts (e.g., nose, upper lip, lower lip, chin, left eye, right eye, etc.), with each face-feature part that can be represented by one of the up to 256 associated face-feature surfaces (FIGS. 5–10), to construct distinctly different 3-D face-composites which can be rendered, in 24-bit color, as 3-D face (head) surfaces. According to the invention, the bookkeeping required for constructing a 3-D face (head)-composite consists of up to sixty-four (64), face-feature parts, identified by their "indices i" and the associated 3-D face (head)-feature surface, identified by its "code j" (FIG. 14). The critically-important consequence of the 3-D framework of the invention, is that, with the already-stored 3-D, 24-bit color graphical information for all the face (head)-feature surfaces (up to 256) for each of the face (head)-feature part (up to 32), the system only requires information as "code j" integers, between 1–255, for each "index i", to be able to render in 3-D, 24-bit color format the complete face (head)-composite. Considering that each "code j", associated with a face (head)-feature surface represents an 8-bit, i.e., 1 Byte integer number (binary), and considering up to 64 (or 128) face-feature attributes, including the face (head)-feature surfaces (up to 32), the invention require the specification of a maximum of 64 (or 128) 1 Byte integers, with a maximum storage requirement of only 64 Bytes (or 128 Bytes) for each composite-face (head) code (FIG. 14). Therefore, the invention provides the capability to store up to 60 million mug shot sets, based on frontal view and profile-view 2-D face images, with less than 4.0 Gigabyte of storage.

The mug shot conversions functionality of the invention provides the procedure for converting a set of two mug shots, as 2-D face images, into a 3-D face (head)-composite (FIGS. 15 through 25). First, the procedure considers the appropriately-cropped and sized 2-D face image of the frontal-view mug shot. It initiates the matching, e.g., conversion procedure, by finding among the already-stored nose-part repository ("index i" as 1) of the nose surfaces, and installing on a base head, the nose surface (e.g., "code j" as 090) that most-closely resembles the nose on the 2-D frontal-view face-image (FIG. 15). It accomplishes the appropriate matching based on geometrical comparisons of the 2-D locations of the fiducial-point templates of the 3-D nose surfaces (FIG. 16).

Second, the procedure considers the appropriately-cropped and sized 2-D face image of the profile-view mug shot. It continues the conversion procedure by matching, independently, and installing on the base head, the nose surface ("code j" as 090) which most-closely resembles the nose on the 2-D profile-view face image (FIG. 17). It accomplishes the appropriate matching based on the geometrical comparison of the 2-D locations of the fiducial-point templates of the 3-D nose surfaces (FIG. 18). Third, it considers the results of the two independent matching procedures and decides, based on minimum geometrical error considerations, the 3-D nose surface ("code j" as 090) which most-closely resembles the nose in both 2-D frontal-view and profile-view face images (FIGS. 16 and 18).

The mug shot conversion functionality of the invention continues the matching procedure for all, up to 32, facial-feature parts, including, e.g., the left/right-ear parts (FIGS. 19 and 20), and systematically continues the assembly of the face (head)-composite, by considering both the frontal-view and profile-view observation of the partially-assembled face (head)-composites at different levels (FIGS. 21 and 22). Finally, for the two, i.e., frontal-view and profile-view, 2-D face images of the mug shot set, the mug shot-conversion procedure of the invention establishes the completely assembled 3-D face (head) composite (FIGS. 23 and 24).

Two consequences of the mug shot-conversion procedure of the invention is critically important. First, the final, completely-assembled 3-D face (head)-composite naturally provides geometrically accurate and realistic representations of the frontal-view and profile-view observations corresponding to the set of two mug shots. But more importantly, it can also provide geometrically accurate and realistic representations of any and all specified angled-view observations of the 3-D face (head) composite corresponding to the set of two mug shots. Therefore, first, the invention establishes a geometrically-accurate and realistic 3-D face (head)-composite corresponding to the original 2-D face images of the mug shot set, based on, importantly, appropriate assembly of the 3-D face surfaces (with "code j") of the face-feature parts (with "index i"), which are maintained in its face-feature-part repositories. Second, the invention establishes the essential face (head) composite code which requires at most 64 Bytes.

The mug shot conversion functionality accomplishes the conversion of the available 2-D, pixel-intensity-dependent face-image data, associated with the original set of two, frontal-view and profile-view mug shots, with a face (head)-composite code of at most 64 Bytes (FIG. 14). Consequently, the invention provides the ultimate data-compression format for storing the required information for the mug shot records.

The general picture-conversion functionality of the invention provides the procedure for converting a single, angled-view (arbitrary) 2-D face image of a person, generally as an unknown person, into a 3-D face (head)-composite (FIGS. 27 through 31). The picture conversion functionality of the invention is based on the same procedure of the mug shot conversion functionality, with the exception that the procedure is not limited to considering only the frontal-view and profile-view 2-D face-images of the mug shots, but one or more angled-view 2-D face images obtained as captured pictures (generally obtained from surveillance equipment). The picture conversion procedure considers the appropriately-cropped and sized 2-D face image of the available angled-view picture. It initiates the conversion procedure by matching, i.e., finding among the already-stored nose-part repository ("index i" as 1) of the nose surfaces, and installing on an appropriately-oriented base head, the nose surface (e.g., "code j" as 090) that most-closely resembles the nose on the 2-D angled-view face-image (FIG. 27). Again, it accomplishes the appropriate matching based on geometrical comparisons of the 2-D locations of the fiducial-point templates of the 3-D nose surfaces (FIG. 28). An important aspect of the picture conversion functionality of the invention is that the procedure systematically considers different angled-view conditions of the fiducial points of the 3-D nose-template to match simultaneously both the angled-view conditions (e.g., 20 degree rotated, 15 degree upward, and 5 degree sidewise tilted) and the 3-D nose surface (e.g., "code j" as 090).

Again, the picture-conversion functionality of the invention continues the matching procedure for all, up to 32, facial-feature parts, including, e.g., right-ear part (FIG. 29) and systematically continues the assembly of the face (head)-composite, by considering only the single partially assembled face (head)-composites at different levels (FIGS. 30 and 31). Finally, for the given 2-D angled-view face-image as the captured picture of a person, the picture-conversion procedure of the invention establishes the completely assembled 3-D face (head)-composite (FIG. 31).

The two consequences of the picture-conversion procedure of the invention are critically important. First, the final, completely-assembled 3-D face (head)-composite naturally provides geometrically accurate and realistic representation of the given angled-view observation of the picture of the person. Again, more importantly, it can also provide geometrically accurate and realistic representations of any and all specified angle-view observations of the 3-D face (head)-composite, corresponding to the given 2-D angled-view face-image of the picture.

Therefore, again, the invention establishes a geometrically accurate and realistic 3-D face (head)-composite corresponding to the original 2-D face-image of the picture, based on, importantly, appropriate assembly of the 3-D face-surfaces (with "code j") of the face-feature parts (with "index i") which are maintained in its face-feature-part repositories. Second, again, the invention establishes the essential face (head)-composite code which requires at most 64 Bytes of binary data storage (FIG. 14).

The invention also provides a novel 3-D composite-generator system (FIG. 32) which can be used to generate 3-D composites of perpetrators (or suspects) based on information provided by the victim(s) and/or witness(es). The completely 3-D composite-generation system is designed and constructed as a stand-alone utility (user interface) which can generate 3-D face (head)-composites under all angled-view observation and special lighting conditions. Therefore, the composite generator system (FIG. 32) of the invention allows the law-enforcement/corrections personnel to generate realistic 3-D face (head)-composite according to the conditions similar to the ones encountered by the victim (s) and/or witnesses. The 3-D composite-generator system automatically generates the essential face (head)-composite code which can be used on the fly for comparisons of the generated 3-D face (head)-composite with the available (already processed) mug shot records.

Some of the novel features of the present invention include:

The 3-D face-recognition technology is compatible with existing 2-D images of mug shots. The 3-D images may be projected onto a display as 2-D profile and frontal views of a 3-D face image. The 2-D images are also mapped onto 3-D surface facial feature parts to convert the 2-D images into 3-D images. In addition, the indexing system used in connection with the 3-D images is also applied to the existing 2-D images so that the 2-D images may be retrieved based on the index for the 3-D images.

The 3-D face-identification technology, in which 2-D mug shot photographs are mapped to 3-D facial feature parts, allows angled view pictures of individuals to be generated from the existing 2-D mug shots. Accordingly, a witness may view a suspect from an angled view picture, and is not limited to the frontal and profiled views of a suspect provided by standard mug shots.

The 3-D technology generates each 3-D human face or head from 3-D facial feature parts, e.g., chin, eyes, nose, mouth, etc. In one embodiment of the invention, the human face and head has been divided into sixty-four facial feature parts. Each part is a 3-D facial surface image of an anatomically significant feature of a face or head. There may be sixty-four (64) facial feature parts. When all 64 facial feature parts are assembled in a mosaic a complete 3-D human face is formed. For each facial feature part, a wide variety of different part shapes, (such as 256 different facial feature surface shapes) are available and stored as a 3-D facial feature image surface. For example, a nose facial feature part may have 256 different nose shapes that can be selected in generating a particular nose for a facial image. Virtually any human face can be generated from the 64 different facial feature parts, and the group of facial feature shapes for each part.

Each shape in a group of a facial feature part is ranked in order of its distinctiveness with respect to the other shapes in the same group. For example, the most distinctive noses, e.g., large protruding noses, having a high ranking, and small, non-descript noses having a low ranking. Highly distinctive facial features tend to be the most quickly recognized and the most long remembered by witnesses. By assigning a high ranking to distinctive facial feature parts, these quickly recognized and most long remembered are displayed first to speed the facial recognition process.

Each of the facial-features parts and their associated shapes are stored in local memory as high-spatial-resolution-3-D geometric surface shapes. There may also be color complexion data that is locally stored for use in applying skin color tones to the generated 3-D images of faces and heads. The amount of memory required to store the data for all of the 3-D 64 facial feature parts and the associated 256 part shapes is about two gigabytes of binary storage space. In contrast, the memory space required for the available forty million 2-D mug shots would require about 73,780 gigabytes, and even if these mug shots are compressed the memory requirement would be 734 gigabytes. It is substantially more practical to locally store on a law enforcement computer 3-D facial feature parts that can be assembled to form any face image, rather than to locally store the actual 2-D images.

With the present invention, the number of facial images is not a dominant factor determining the memory storage requirements. All human faces can be formed from the facial feature parts stored locally to a law enforcement computer. An image of any particular individual may be generated from the facial feature parts stored in the computer. There are identifying codes (i, j composite codes discussed below) for those individual's whose faces have been cataloged into a mug shot database. The identifying codes are used to identify the features of the individual's face. Moreover, the identifying codes are correlated to the 3-D facial feature parts. The memory required to store the identifying codes of an individual is negligible as compared to the memory space required to store an actual image of the individual. The present invention can generate a facial image of an individual by selecting the facial feature part shapes that match the individual based on the identifying composite code for the individual. Accordingly, an increasingly larger number of identifying "composite" codes can be stored locally, without requiring substantial additional memory.

The present invention also has the ability to recognize a suspect's facial image by assigning identifying composite code values to the image, and then using these codes to select mug shot photographs having the same and similar identifying code values. The shape of each facial feature part is identifiable by a low spatial resolution 3-D technique that uses a relatively small number, (e.g., less than fifty (50) points and, in the preferred embodiment is only 32 points), facial feature fiducial points. These fiducial points are assigned to anatomically critical points of a facial feature part. A fiducial point is a point on the surface of a facial feature part that can be used to identify the shape of the particular part and to assign a proper composite code to the facial feature. Each fiducial point is specified by a position vector that defines a position of the surface point. The position vector may be defined by only thirty (30) bits of data. Each facial feature shape may be identified by 32 position vectors that locate the positions of surface features of the shape of the facial part. The fiducial points are used to identify a facial image and to compare the image of one face to other facial images. By identifying the fiducial points on the picture of a suspect, the suspect's facial image may be mapped to the 3-D facial feature parts and used to determine the composite codes for the facial image and generate a 3-D facial image of the suspect. In addition, once the composite codes may be used to search for other facial images that are the same as or similar to the suspect's facial image. Accordingly, the invention has the capability of facial image recognition using a relatively small number of facial feature fiducial points.

The invention also provides a fast search engine for finding facial images that are the same or similar to the facial image of a suspect or other person. By mapping the fiducial points of a facial image of an individual, the composite codes corresponding to the individual's facial image can be determined. These composite codes are used to search for other facial images (in mug shot databases) that have the same or similar composite codes. The search for the same and similar composite codes in tens of millions of mug shot codes is done much faster than would an image-to-image search through the mug shot images. Thus, the present invention allows for a quick search to be conducted of other mug shots that match the image of a suspect.

BRIEF DESCRIPTION OF THE DRAWINGS

These, as well as other objects and advantages of this invention, will be more completely understood and appreciated by careful study of the following more detailed description of a presently-preferred exemplary embodiment of the invention taken in conjunction with the accompanying drawings, of which:

FIGS. 11 to 13 illustrate composite codes and associated facial feature parts and surfaces;

FIG. 14 shows an exemplary list of composite code of a 3-D face and head image;

FIGS. 15 to 18 are diagrams illustrating the adding of a nose facial surface to a face image, and the fiducial points used to map a nose;

FIGS. 19 to 24 shows the fiducial points for an image of an ear and the addition of an ear to a face image;

FIGS. 27 to 30 show left angled views illustrating the generation of a facial image;

FIG. 31 shows face images generated from composite codes and facial feature surfaces;

DETAILED DESCRIPTION OF THE DRAWINGS

Figure 33:
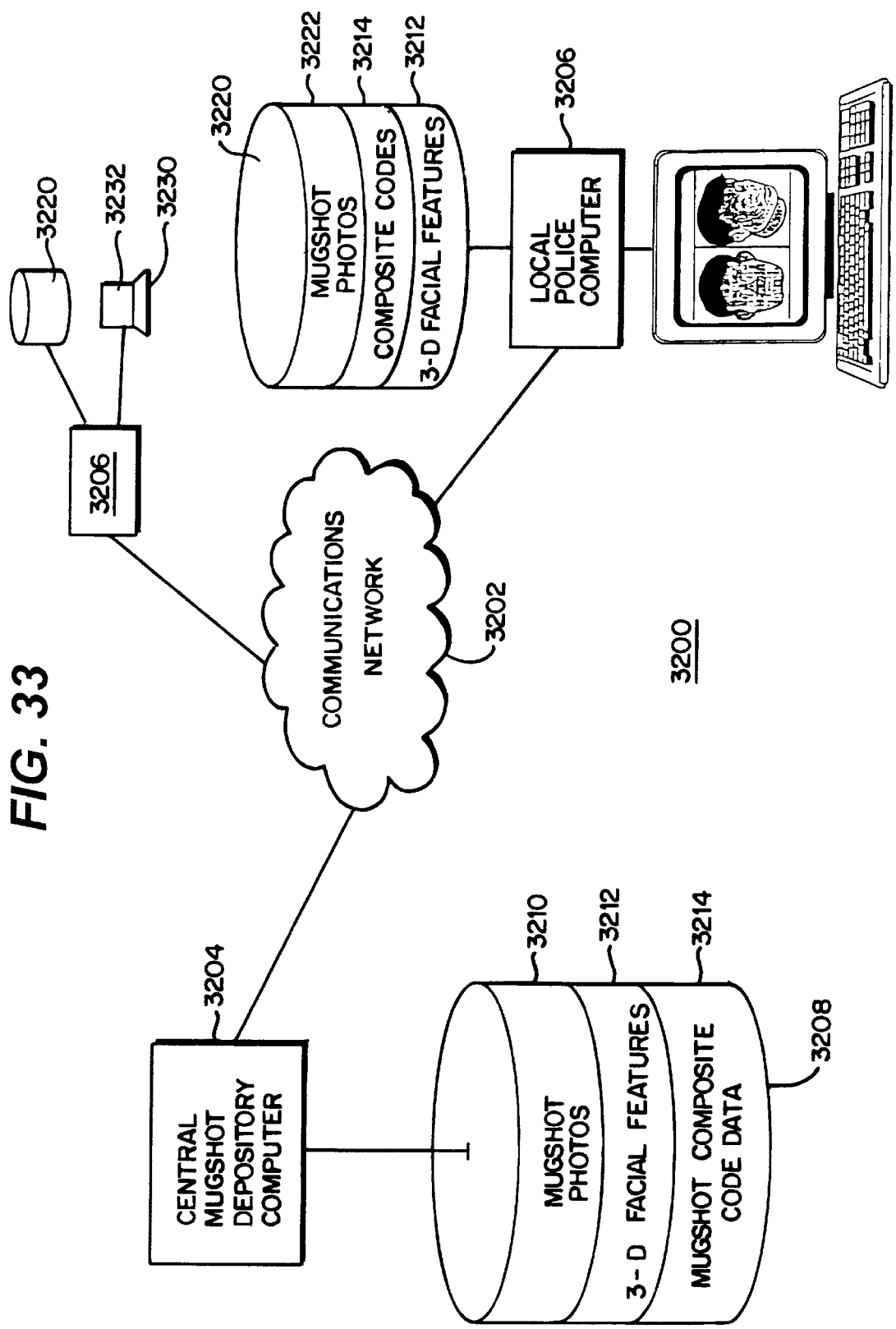
FIG. 33 is a schematic diagram of a computer network capable of running the present invention.

FIG. 33 shows a schematic diagram of a computer network for operating the present invention. The invention may be operated on a wide area network (WAN) 3200 or on separate computer systems that share data by some means, such as modem, Internet, physical disk transfer or wireless connection. The network includes a communication network 3202 that may be implemented via the Internet, direct modem-to-modem telephone links, wireless, satellite or other commonly-available network technologies for inter-linking computer systems. The communication network may link a central mug shot depository computer 3204 to a plurality of local law enforcement computer systems 3206. The wide area network allows law enforcement officials from their local computer system to access mug shots stored either on their own computer system and/or on a central depository computer 3204. Moreover, the mug shots may be stored on other law enforcement computer systems and accessed remotely by another law enforcement computer.

The central mug shot depository computer 3204 may be a mug shot depository computer system to be maintained by the United States Department of Justice, and, in particular, the Federal Bureau of Investigation (FBI). The FBI maintains a central mug shot depository on a computer which is accessible over modem lines by local law enforcement computers to obtain mug shot photographs. It is envisioned that the FBI central computer system will maintain a database 3208 of mug shot photos 3210, uniform 3-D facial features images 3212, and mug shot deposit code data 3214.

The data for the mug shot photos may be two-dimensional images of an individual's face, showing the face in profile and plan views. The images may be stored in a standard image file format, e.g., JPEG, GIF, TIT, etc., which utilizes some form of data compression to save storage space. The images may be in black and white, or color. The images preferably conform to normal formats for law enforcement mug shots photos, in terms of field of view, picture lighting, camera distance to individual, etc.

The amount of memory space taken up by each mug shot image is relatively large. Considering that the FBI's mug shot database includes tens of millions of images, the amount of computer memory space required to store all of these images is tremendous. The central database 3208 is the primary storage facility for the mug shot data. It is practically impossible for local law enforcement stations to store a large number of mug shots as image files. Typically, local law enforcement store on its local computer memory 3220 a database 3222 of images of persons who have been suspects in the local region of the law enforcement organization. Thus, often times the local law enforcement organizations do not have access to mug shots of individuals outside of their local areas. There is a need for local law enforcement organizations to have access to mug shots that are not stored in their local computer systems.

Figure 1:
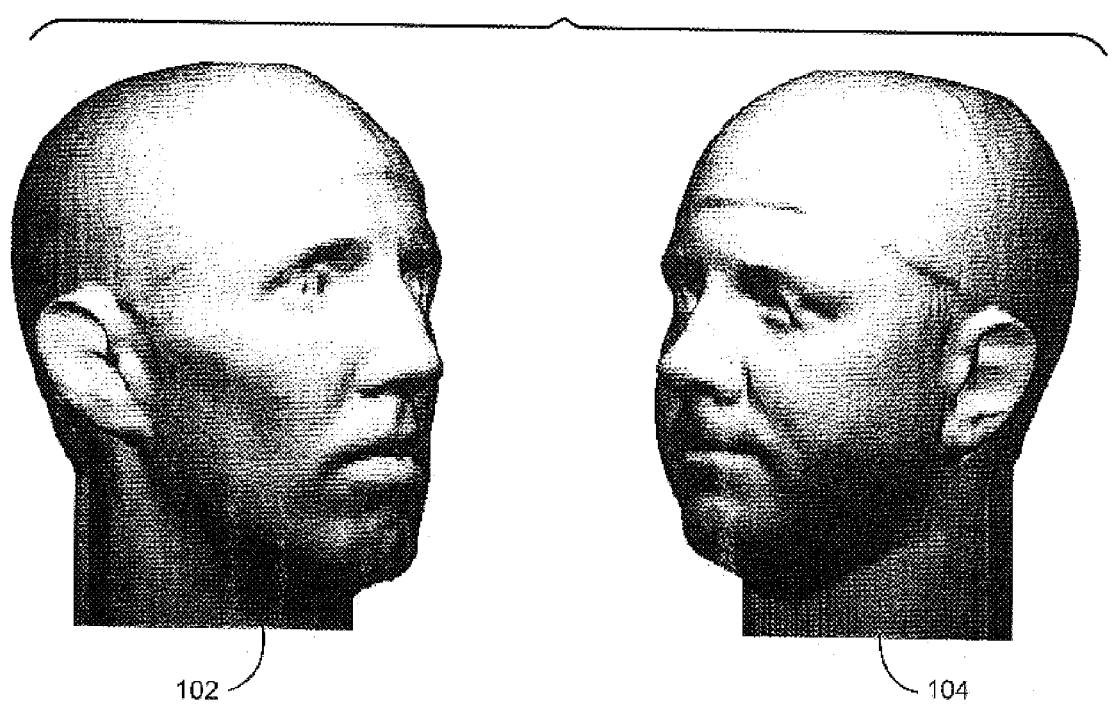
FIG. 1 is a diagram showing two angled views of a 3-D human head image.
Figure 2:
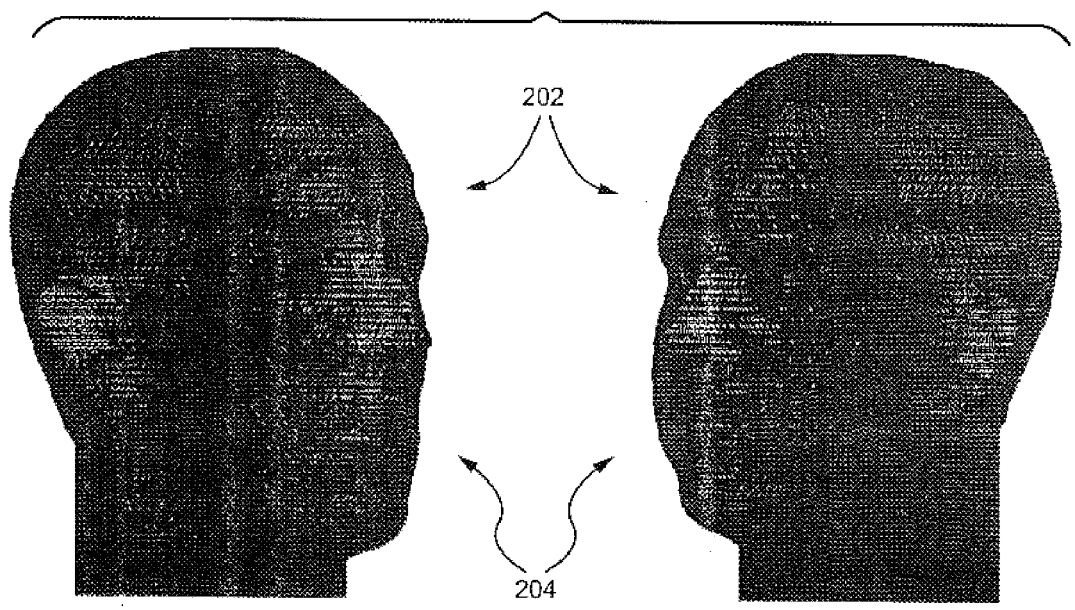
FIGS. 2 to 4 are wire frame images of the head image shown in FIG. 1.
Figure 3:
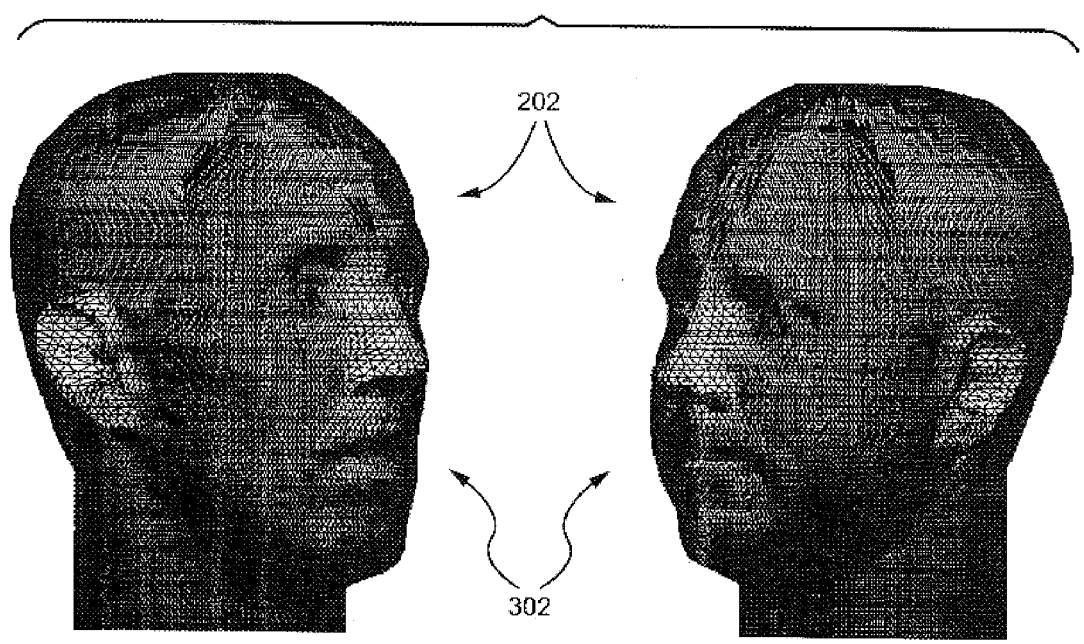
Figure 4:
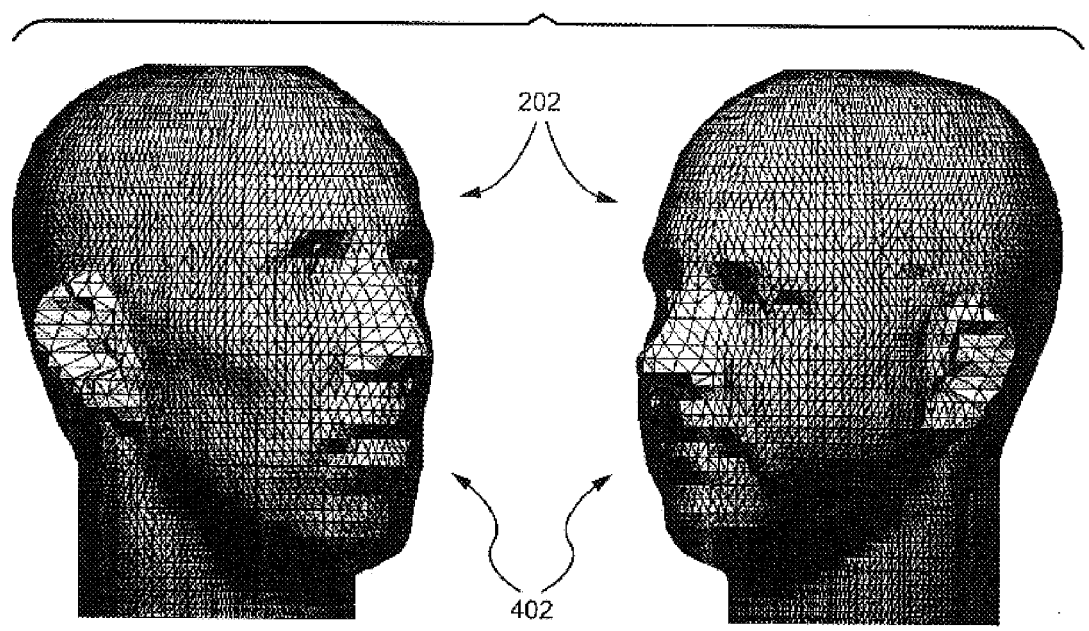

The invention provides a means to characterize individuals shown in mug shots by their 3-D facial features. In particular, a database 3212 of uniform 3-D facial feature parts is maintained in the central database, and in local computer databases 3220. FIG. 1 shows examples of a 3-D human head (right-angled view 102 and left-angled view 104) stored as graphical wire frame images 202 (FIGS. 2 to 4) in computer memory. A relatively-low resolution wire frame image 402 is shown as being formed of a set of parallel and perpendicular lines, a medium resolution wire frame image 302 and a high resolution wire frame image 204 is shown as a set of geometric lines more closely spaced together than in the low-resolution image 404 or medium resolution image 302. Other graphical techniques may be used to depict 3-D images, such as a bit map image, character mapping, etc. that are well-known to persons skill in computer graphical imaging.

Figure 5:
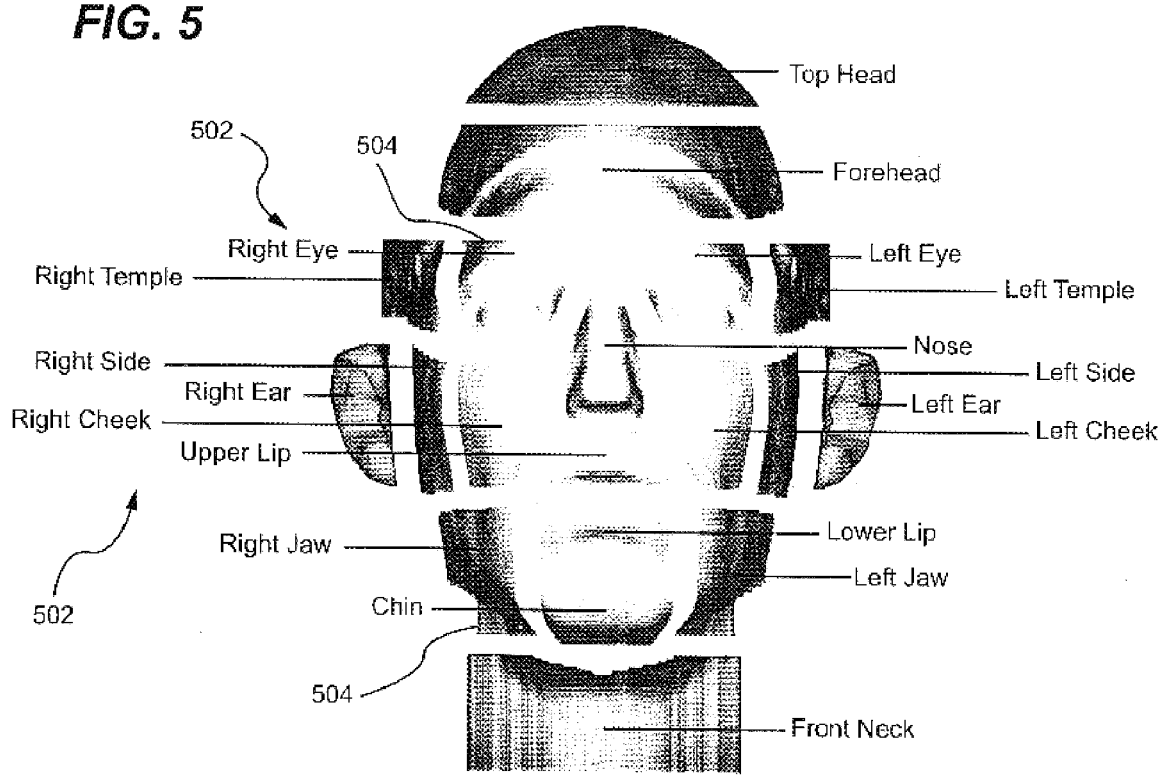
FIGS. 5 and 6 are illustrations showing exemplary facial-feature parts.
Figure 6:
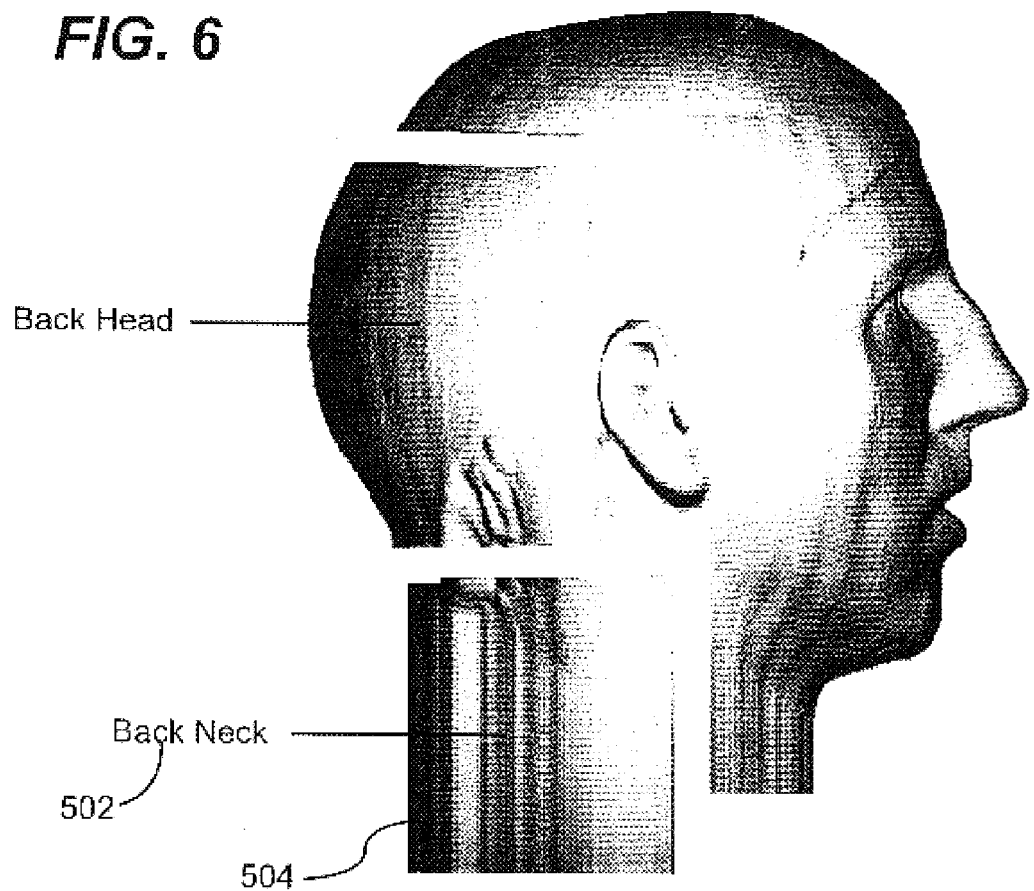
Figure 7:
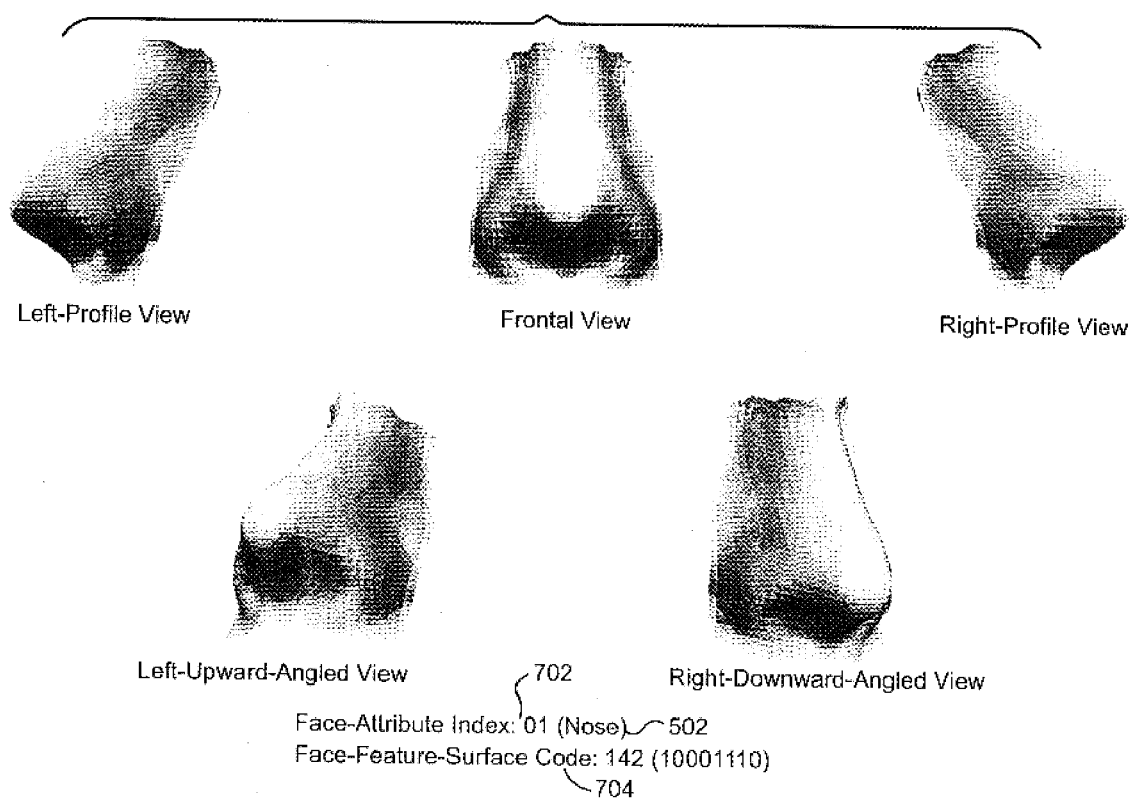
FIGS. 7 to 10 are illustrations showing various views of exemplary face surface, including images with fiducial points.
Figure 8:
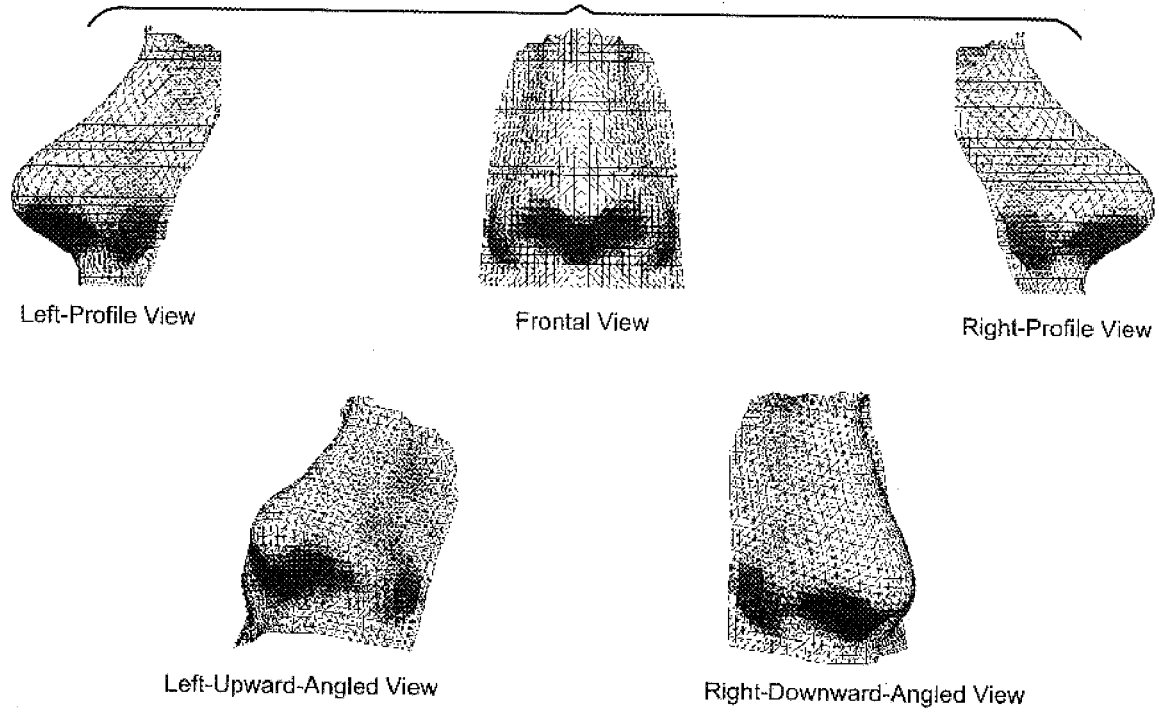
Figure 9:
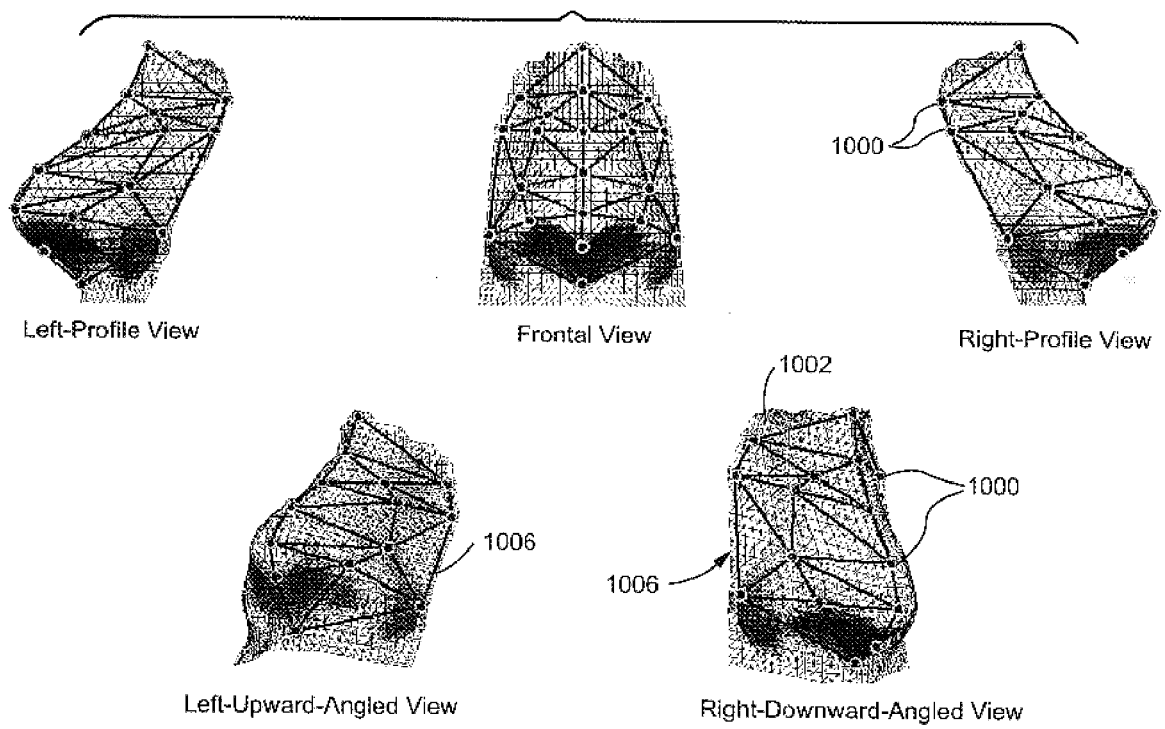

Each human head is divided into facial feature parts, as is shown in FIGS. 5 to 6. Each facial feature part is a section of the facial surface feature 502 of the 3-D digital head images, e.g., a mouth, nose, eyes, forehead, chin, ears, etc. As is shown in FIGS. 7 to 13, each generic facial-feature-part 502 is assigned an "i" number 702, which in the case of a nose may be the numeral "01". See FIGS. 14 and 26. This "i" number 1400 is used to identify the generic facial feature part, e.g., chin, mouth, eye, etc. The facial feature parts are anatomically-prominent facial features. In addition to features common to all human faces, they may include facial defects, such as scars, and other features, such as tattoos.

In addition, each shape variation of a facial feature part is assigned a "j" number 704. FIG. 14 identifies a group 1402 of "j" codes for each part 1400. As shown in FIG. 12, a relatively square chin is assigned j numeral 001, a protruding chin is assigned j numeral 082 and a rounded chin is assigned j numeral 255. Moreover, there may be many additional chin variations that are depicted as 3-D facial feature parts and assigned a j numeral so that nearly all possible variations of that facial feature part are represented by one of the j-numbered parts. For example, just about every human chin will correspond to one of the j-numbered chins that are stored as a 3-D facial feature surface in the computer database. Similarly, facial feature shapes are stored in the database for noses (FIG. 11), ears (FIG. 13) and all of the other facial feature parts.

By separating each facial feature into a distinct 3-D facial feature parts, (e.g., mouth, ears, nose, eyes, chin for a total of 64 facial feature parts) as shown in FIGS. 5 and 6, an inventory (repository) of facial feature parts and shapes is created. This repository is stored locally in computer databases.

Figure 32:
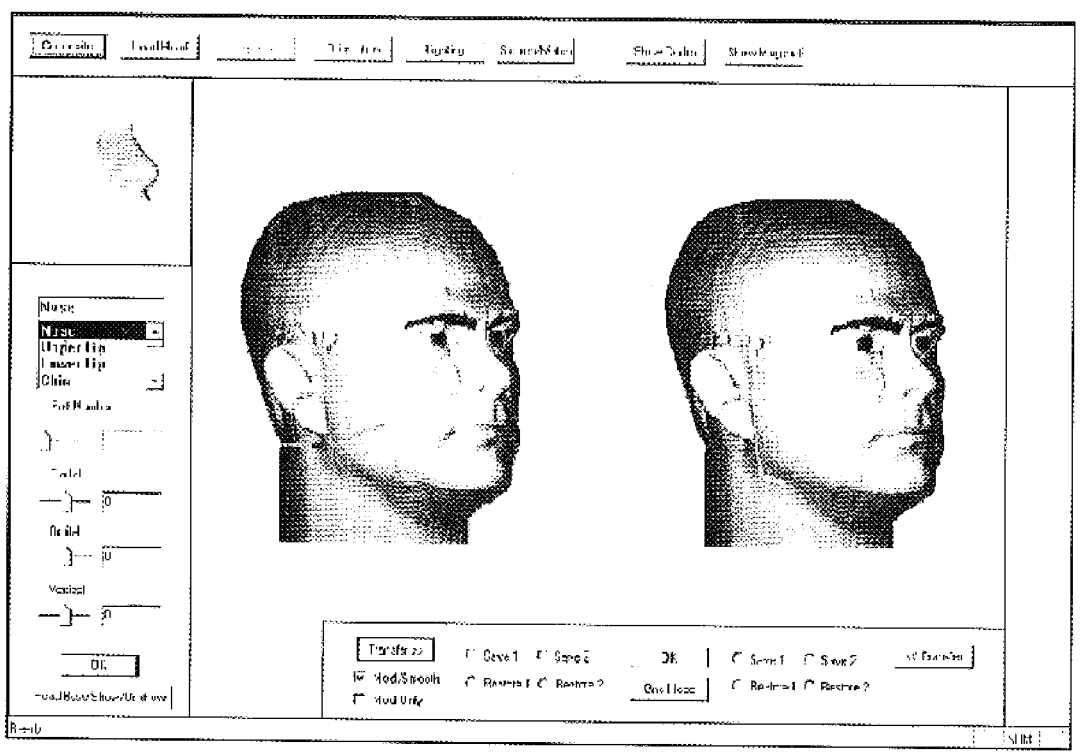
FIG. 32 shows an exemplary screen display used in generating a facial image.

Any human face can be formed by selecting and assembling the facial feature parts and shapes from the inventory, which is stored as the facial feature databases. A law enforcement technician can create a 3-D image of the face of a suspect by selecting the shape version of each facial features parts that conforms to the suspect's face. As shown in FIG. 32, the technician will select the nose shape, e.g., small nose, that looks most like the nose of the suspect. Similarly, the law enforcement technician will select other facial feature shapes, e.g., eyes, chin, mouth, etc., that look most like those features on the face of the suspect.

When the technician has completed selecting the version of each facial feature part that best corresponds to a suspect, the local law enforcement computer assembles the selected facial feature parts to generate a 3-D image of the suspect's face and head. The local law enforcement computer 3206 has a local memory 3220 that contains a database of 3-D facial feature parts 3212. This database of facial feature parts includes data which is representative of a 3-D surface image of each of the shapes of all facial feature parts. For example, the facial feature parts database stored on each local computer memory includes a complete of all versions of facial feature parts and shapes. Thus, a 3-D image of any suspect's face and head can be generated from the facial feature parts database stored locally at each law enforcement organization office.

The capability of storing locally a database from which a 3-D image of any suspect's head allows local law enforcement to create a computer generated image of a suspect using only the local law enforcement computer. The database of 3-D facial features occupies a relatively small amount of memory. The database 3212 of facial feature parts allows the law enforcement organization to generate 2-D images (such as frontal and profile views of suspects) by using a computerized facial image generation system that stores composite codes and the facial feature parts to form a 3-D facial image. Moreover, a 2-D image of a suspect may be generated from any point of view (or angle of view) because it is based on a 3-D image stored in computer memory. The ability to generate 2-D pictures of suspects from any angle or point of view is a substantial improvement over existing systems that generate 2-D facial images limited to straight-on frontal and profile views of suspects.

As shown in FIGS. 7 to 12 and 28 and 29, each facial feature part shape can be referenced by a code, which consists of an "i" number and a "j" number. These codes form the composite code data 3214, and may be used to identify mug shot photographs based on the facial features shown in each photograph. The composite code data relates to a two-level indexing system for 3-D facial images. In particular, the composition code is a two-layer hierarchical code in which a first (upper) layer (i code) relates to facial feature parts and the second (lower) layer (j codes) relates to the various facial surface shapes of each facial feature part.

Figure 26:
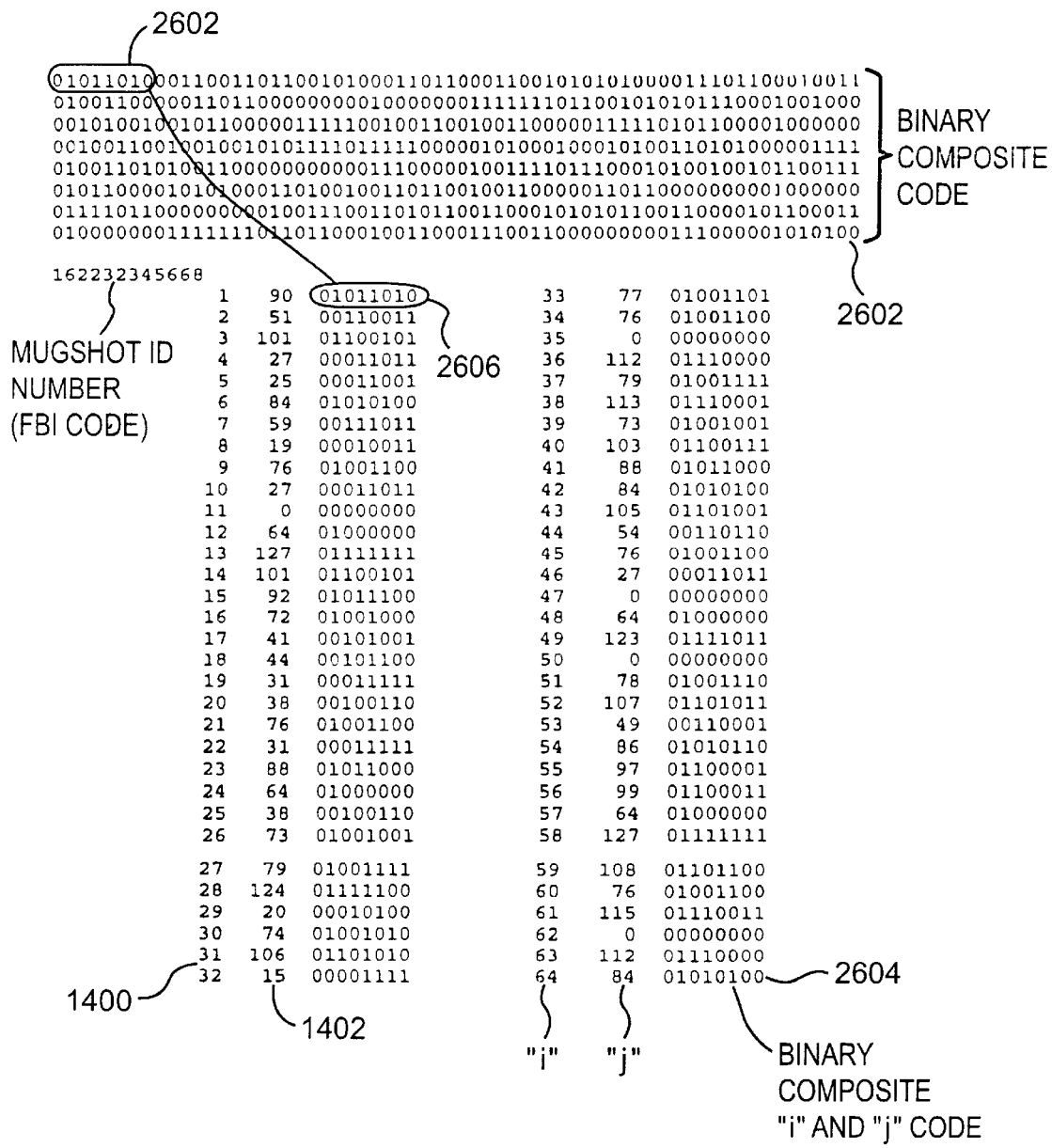
FIG. 26 shows an exemplary composite code.
Figure 28:
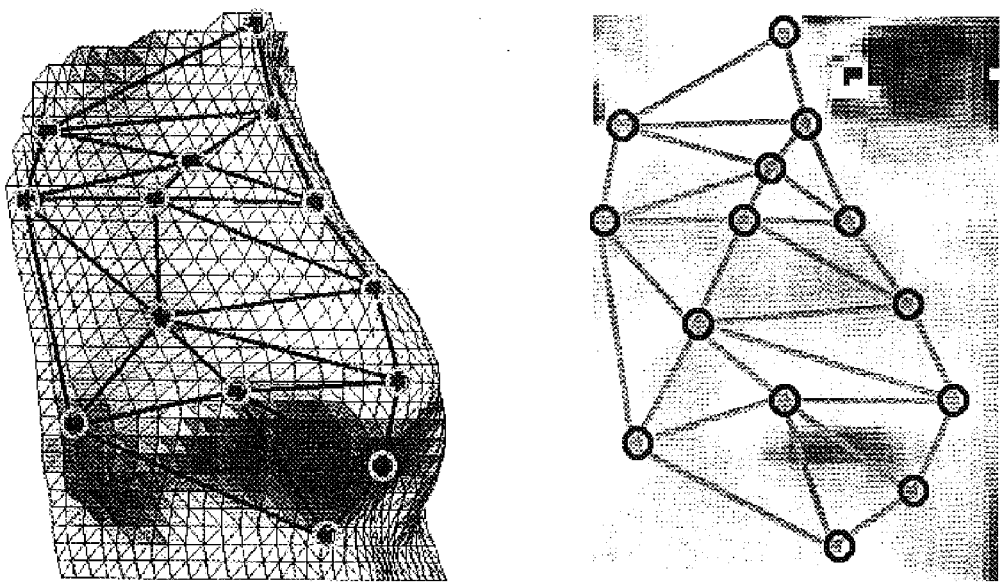

As shown in FIGS. 14 and 26, the "i" numbers represent a generic facial feature part 1400, such as for example a chin (i=04), a nose (i=01), and ears (i=14). The "j" number 1402 corresponds to a particular shape of a generic facial feature part. The j numbers are assigned to each shape variation of all other generic facial feature parts. In the disclosed example, there are two-hundred and fifty six (256) variations (represented by j numbers) of each of the sixty-four (64) facial feature parts, represented by i numbers. The composite code 2602 is the combination of i and j (part shapes 2604) numbers that are needed to define a particular face. Each mug shot can be identified and reconstructed by a 64 Bytes composite code 2602 that identifies the specific i and j numbers 2606 that correspond to the facial feature part shapes show in the mug shot.

Figure 34:
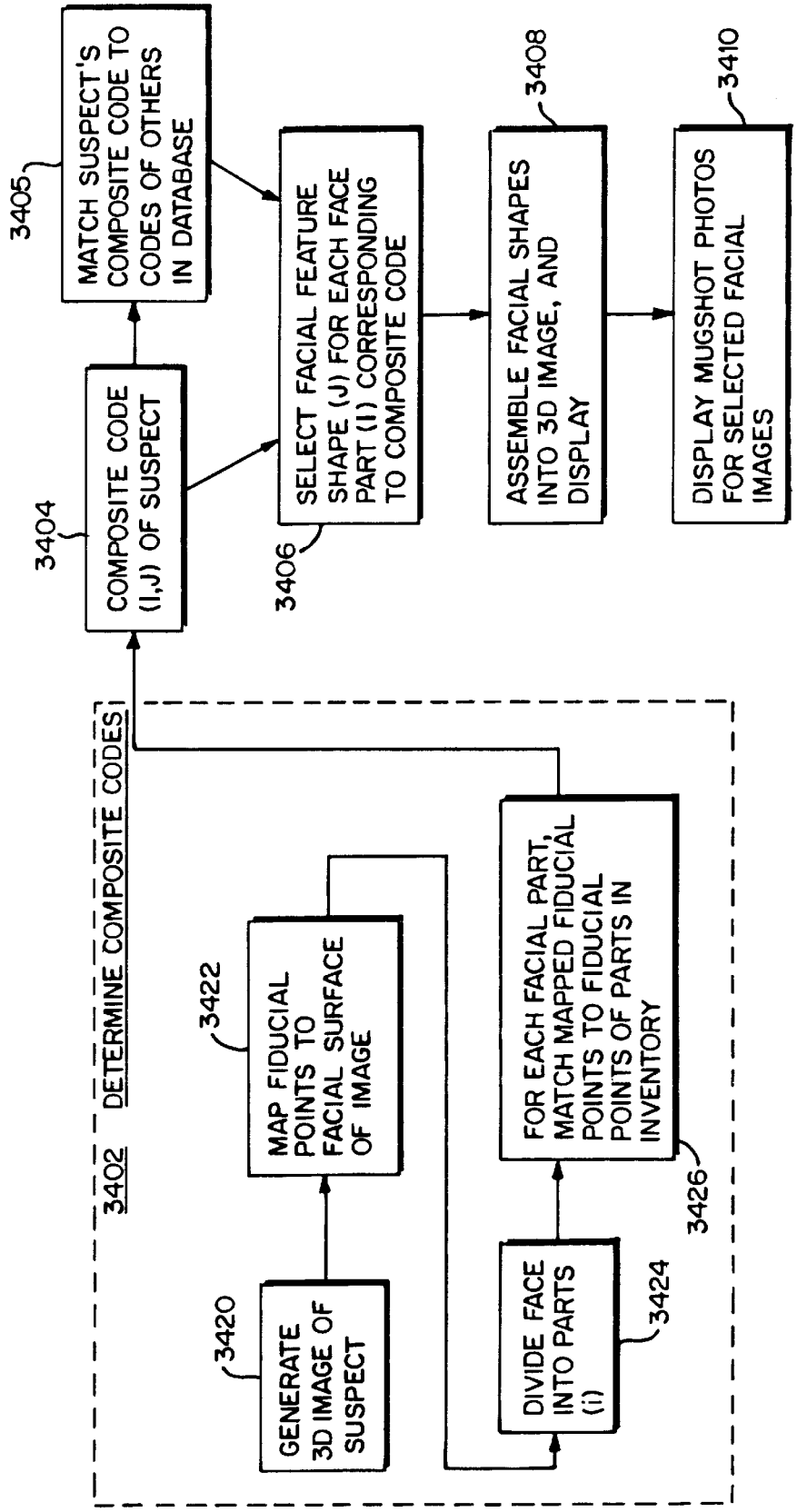
FIG. 34 is a flow chart showing an exemplary computer program for implementing certain aspects of the present invention.

The local law enforcement computer generates a 3-D image of the mug shot from the facial composite code data for the individual shown in the mug shot and the 3-D images of facial feature parts stored locally on the computer system. The flow chart in FIG. 34 shows the steps for generating a 3-D image of a human face. A composite code classification process 3202, described below, determines the i and j numbers for a particular face. Once the i and j numbers are determined for an entire composite code of a face, the code is correlated, step 3204, with the composite code database to match the composite code with the composite codes of mug shots stored in database. The composite code database in the local law enforcement computer stores the composite codes for a large number of mug shots. The memory requirements for storing i, j codes is substantially less than the memory that would be required to store the images of all mug shots. Accordingly, it is more practical to store locally just the i, j codes and not the mug shot images.

A comparative search through the local composite code database will quickly find a group of composite codes for mug shots that correspond to the i, j codes used as the basis of the search, in step 805. The match of i, j codes does not have to be exact, and the search may yield a confidence rating for each match that indicates how close the j codes for a particular mug shot are to the j codes used as the basis of the search. The i codes are always matched because they only refer to a generic facial part, and all mug shot faces have all of the same generic facial parts (unless some of the j codes are assigned to facial defects or tattoos).

In step 3406, 3-D images of faces are generated from each of the composite codes that were located in the search of mug shot composite codes in step 3405, and of the composite (i, j) codes that were identified in step 3404. The law enforcement computer generates a 3-D image by assembling as a mosaic of the 3-D surface facial feature shapes that correspond to a particular j code for each of the facial feature codes designated by the i codes. Accordingly, in step 3408, the local computer generates a 3-D image of a suspect from the composite (i, j) codes identified and/or the local computer generates a 3-D image of each of the potential suspects whose mug shots match the composite codes that were used in the search. With the 3-D image, the local computer generates a 2-D image for display on the monitor 3230 from any perspective, e.g., profile, angled or frontal., that is desired. To view directly the mug shot of any of the persons for whom a facial image has been generated, the local law enforcement computer may access a local or remote mug shot photo database 3222 to obtain an actual photograph(s) of the individual and other information regarding the individual, in step 3410.

The composite code classification process, step 3402, involves the assignment of codes to images of the faces individuals. In most instances, the composite code will be determined by mapping fiducial points on the 3-D facial image. As shown in FIGS. 9, 10, 28 and 29 fiducial point 1000 is a particular spatial position on the surface of the face or head being imaged. A image surface can be defined in three dimensions by use of an appropriate number of fiducial points. In an embodiment of the present invention a relatively low-number (i.e., low resolution) of fiducial points is used to uniquely identify each high resolution facial shape 1002 (j) in a group of a face part (i).

Figure 10:
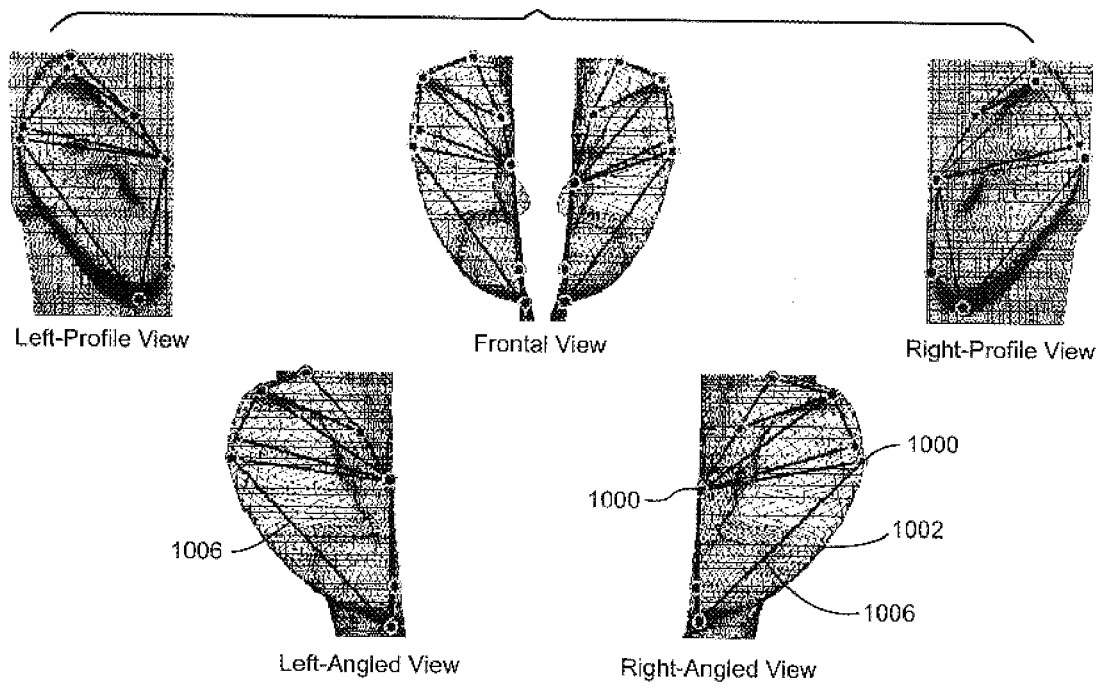
Figure 11:
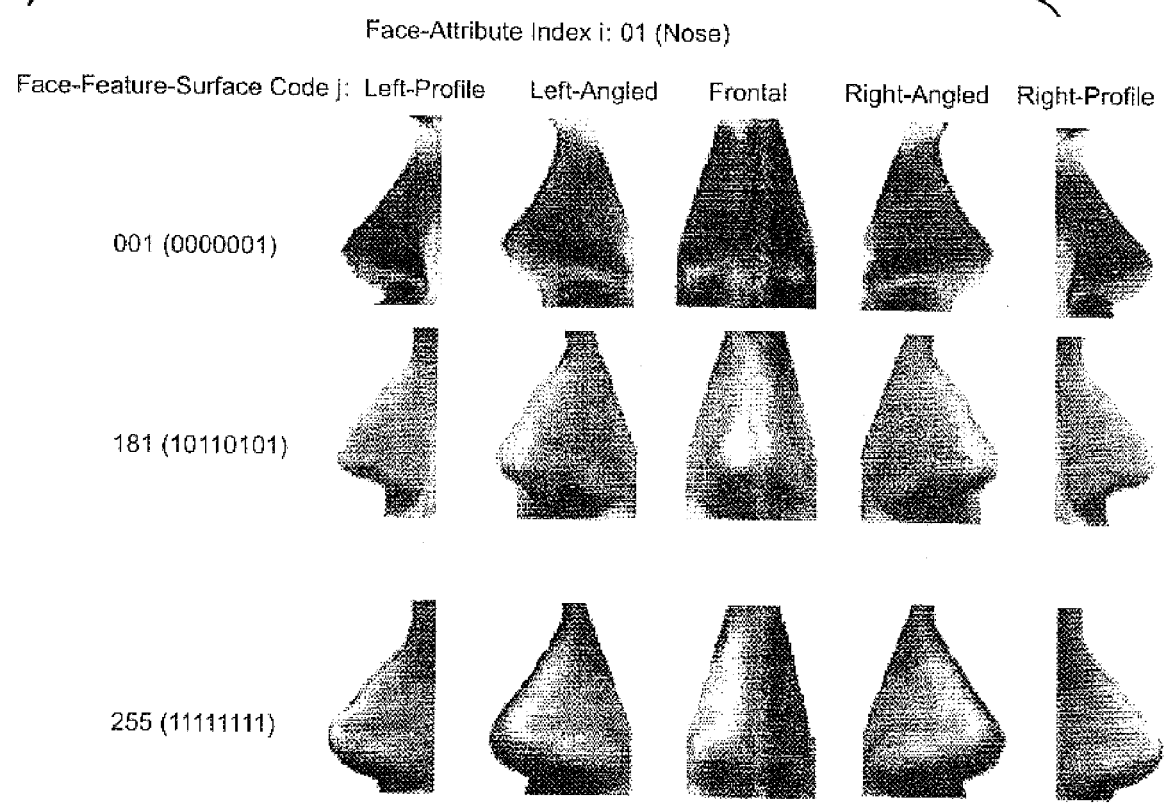
Figure 13:
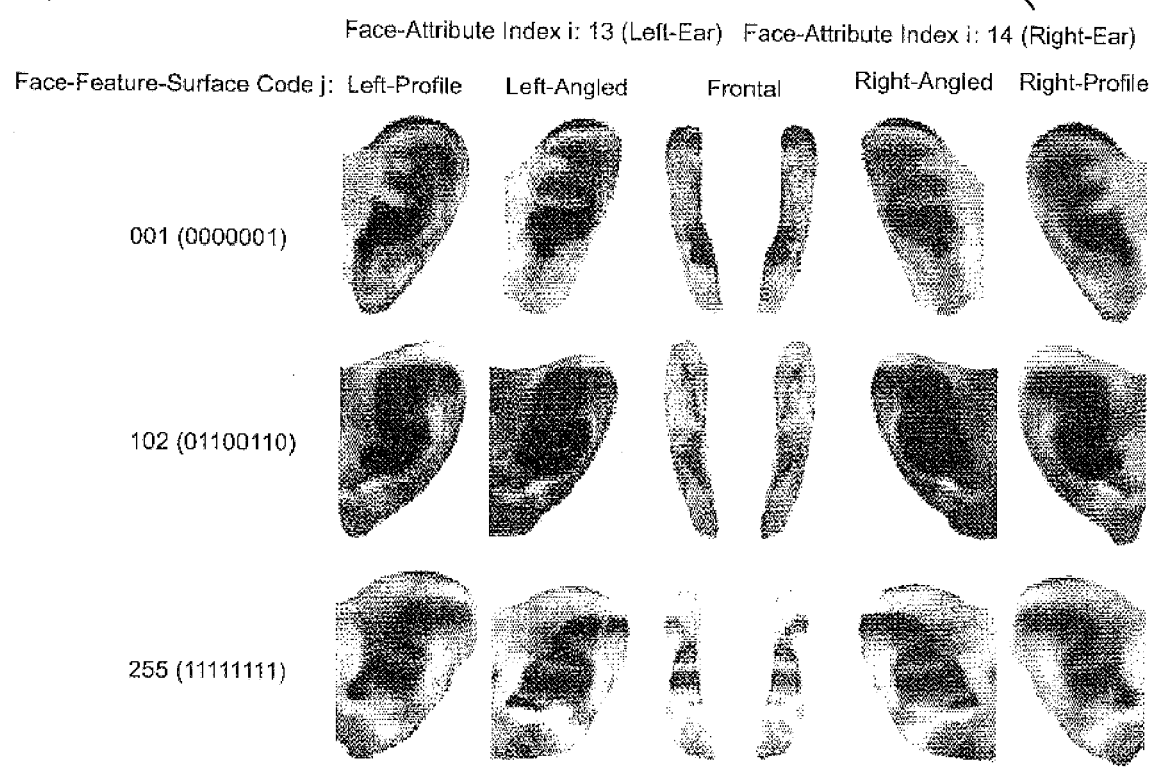
Figure 15:
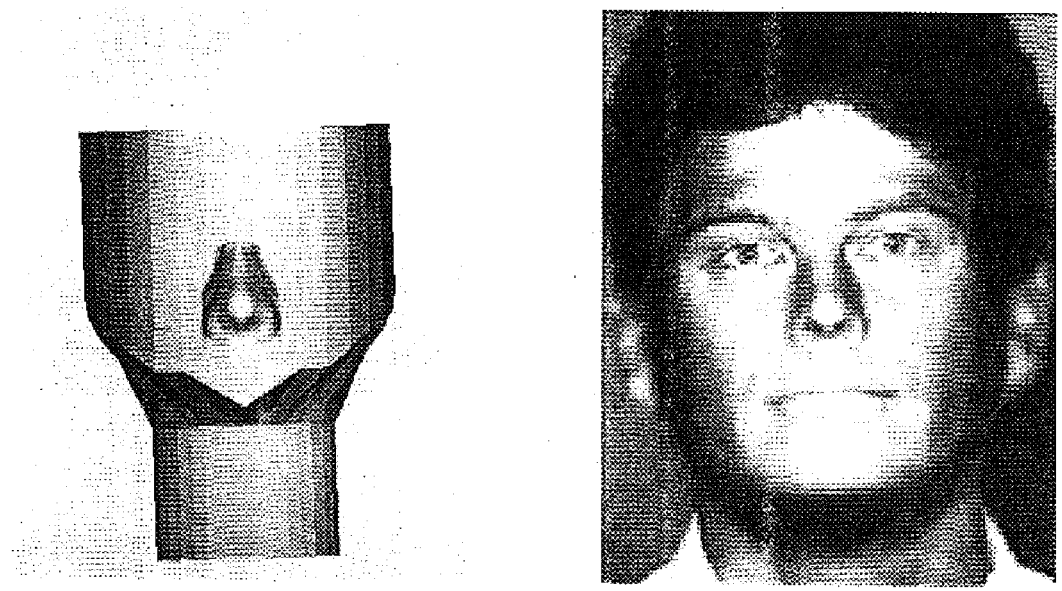
Figure 17:
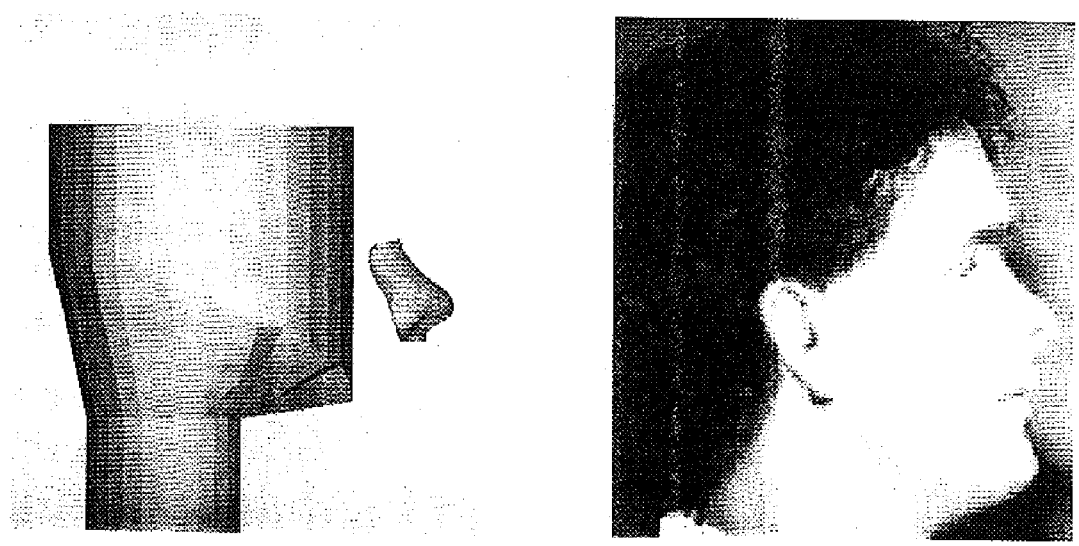
Figure 19:
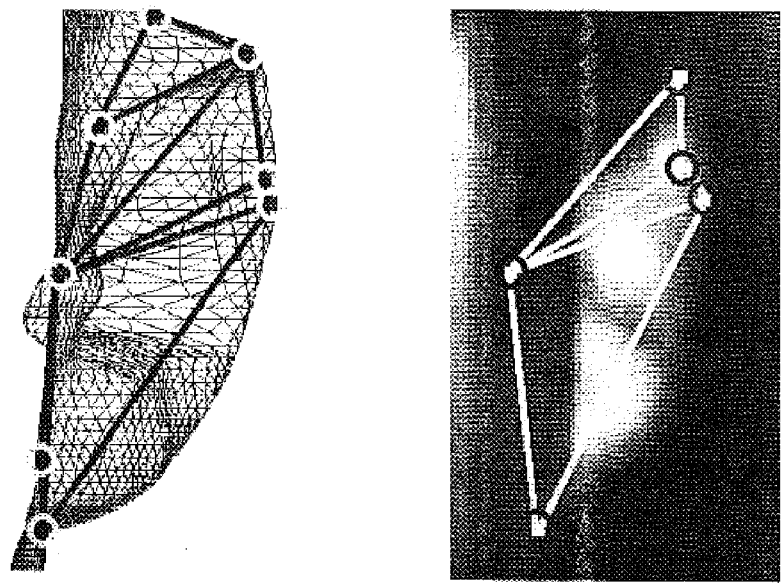
Figure 20:
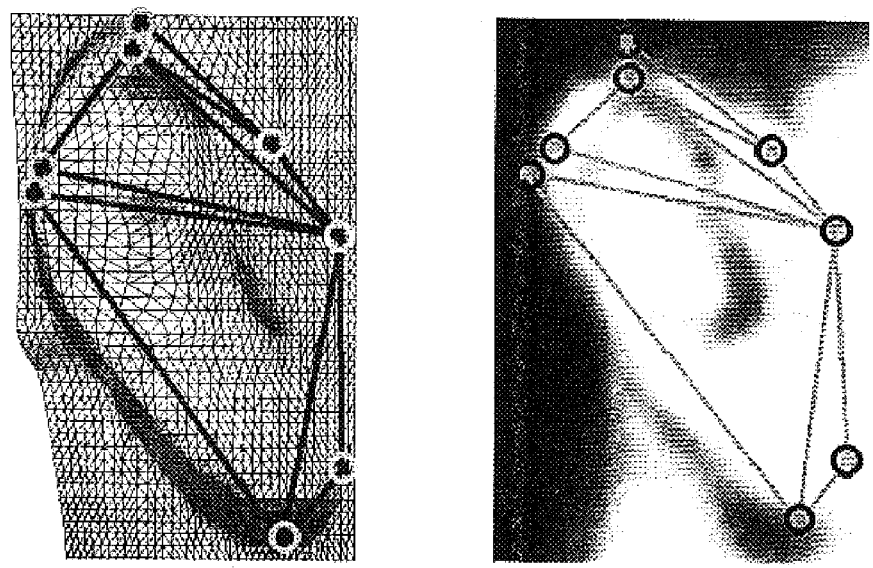
Figure 25:
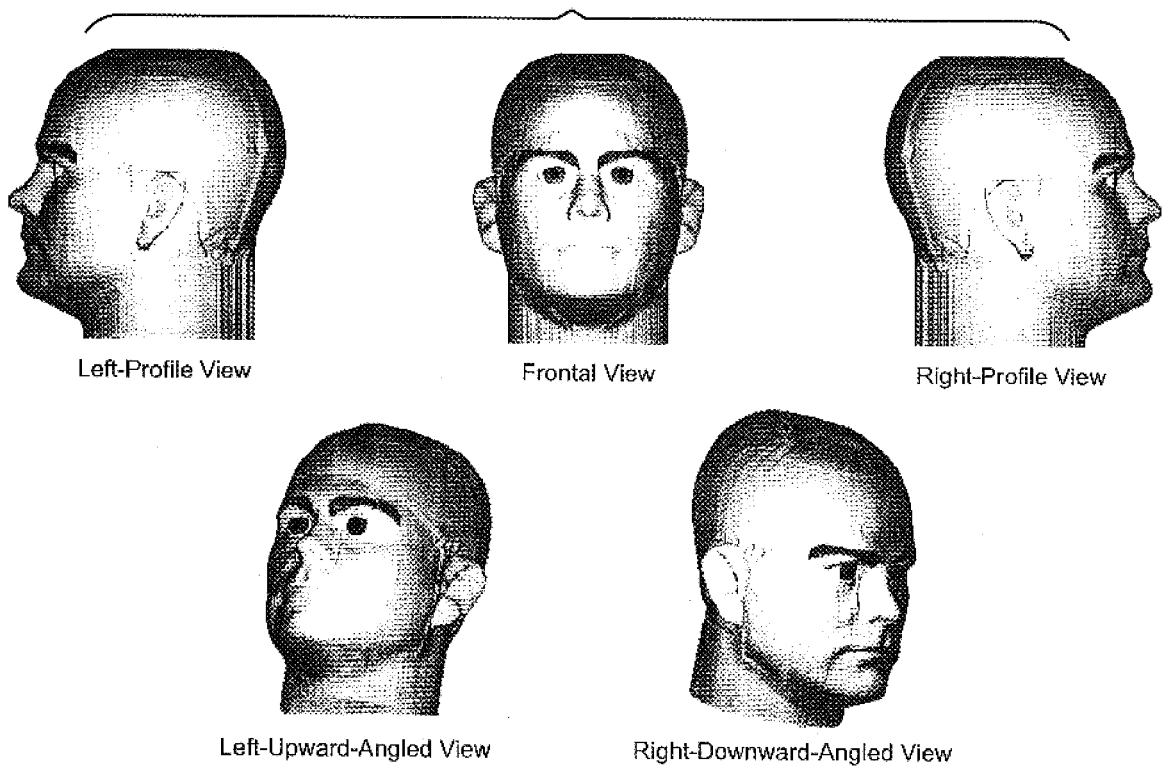
FIG. 25 shows various views of a partially-completed facial image.

In step 3420, a facial image, (preferably a 3-D image), of a suspect is entered into the local law enforcement computer system. The image is analyzed to determine the spatial dimensions of certain predetermined fiducial points. FIGS. 9, 10, 28 and 29 show examples of 3-D fiducial points mapped on facial feature parts. The fiducial points are shown as an array of dots (see e.g., 1000) on parts for a chin, nose (FIG. 9), eyes, mouth and ears (FIGS. 10 and 29).

A relatively-small number of fiducial points, e.g., about 32 points, is mapped onto each facial feature part shape to form a unique fiducial template 1006 for the shape, in steps 3422 and 3426. The fiducial template is defined by the relative positions of the different fiducial points within the template. The fiducial points are located relative to other points in the template, and not to some other coordinate system. Because the fiducial points are located relative to one another it is relatively straight-forward to compensate for the magnification and/or size of the image when determining the fiducial points for a new facial image. The fiducial points may be placed on their proper surface positions on the entire facial image and then the facial image with fiducial points is divided into facial feature parts. Alternatively, the facial image may be divided into parts and then the facial features are positioned on the parts of the image.

Moreover, it is possible to determine the fiducial points from two or more 2-D images by placing the fiducial points on each image and allowing the computer system to transform the different 2-D positions of each point to a 3-D fiducial template. The law enforcement technician placing the points on the facial image must be trained in the proper fiducial points to be placed on each facial feature part. Alternatively, the placement of fiducial points may be automated using standard computer imaging and recognition techniques. In addition, it is also possible to make a crude approximation of a 3-D fiducial template from a single 2-D image, but the margin for errors and uncertainty is relatively large for any template generated from the one 2-D picture.

Once a fiducial template has been create for an image of a facial feature part (or for an entire facial image), then, in step 3426, the template is compared to the templates of all the various facial shapes in the inventory (computer database 3212) for that facial feature part. A fiducial template is stored in memory (3220) for all shapes of each facial feature part. By comparing the fiducial template generated from the facial image, to the fiducial templates stored in memory, a match can be found of the facial image shape to one of the facial shapes in the inventory of the computer. A law enforcement technician and the witness may review the facial feature shapes that are found to match the fiducial template for the image and select the inventoried shape that best corresponds to the image and/or the recollection of the witness of the suspect's face.

When the best facial part shape from the computer repository 3212 has been selected for each of the facial feature parts, then a image of the suspect can be generated. In addition, the composite codes (i, j), for the best matching facial feature shapes can be determined for use in storing data that can be used to redraw an image of the suspect and to match the suspect's facial image to the faces of persons having their mug shots stored in a law enforcement mug shot data base. Accordingly, the present invention allows law enforcement organizations to utilize a 3-D facial imaging system that allows for angled views, fast searching of other facial images, indexing of 3-D facial features for future searches, and local computer storage of the data needed to redraw a 3-D image of any individual.

The invention has been described in connection with what is considered to be the best mode. The invention is not limited to the disclosed embodiment, and covers various modifications and equivalent arrangements included within the spirit and scope of the appended claims.

What is claimed is:

1. A three-dimensional (3-D) face image generation system comprising:
   a memory unit storing data representing an inventory of three-dimensional (3-D) facial feature shapes, wherein the facial feature shapes are indexed by a composite code, where each composite code identifies a particular facial feature shape and each facial feature has a plurality of associated composite codes and facial feature shapes; and a group of composite codes identifies the facial feature shapes which when assembled together form a facial image of an individual;
   an input device for entering data to select a particular group of composite codes corresponding to a particular individual face;
   a processor operatively connected to the memory unit and input device, and an executing program instructions including instructions to access the memory unit to extract data representing the facial feature shapes corresponding to the particular group of composite codes, and assembling the facial feature shapes into a facial image of the particular individual face, and
   a display on which the facial image is presented.

2. A 3-D face image generation system as in claim 1 wherein the memory unit is a local storage device to the system.

3. A 3-D face image generation system as in claim 1 wherein the composite code includes a first code that identifies a facial feature part and a second code that identifies a particular facial feature shape of the facial feature part.

4. A 3-D face image generation system as in claim 3 wherein the composite code is hierarchical and the first code is an upper level code, and the second code is a lower level code of the first code.

5. A 3-D face image generation system as in claim 1 wherein the facial feature shapes are represented as three-dimensional surface data.

6. A 3-D face image generation system as in claim 1 wherein the memory unit also stores fiducial point templates corresponding to the facial feature shapes, and the processor executes instructs to compare a template corresponding to fiducial points on an image entered via the input device to the fiducial point templates stored in the memory unit.

7. A 3-D face image generation system as in claim 6 wherein the fiducial point templates are formed of less than fifty fiducial points on the corresponding facial feature shape.

8. A 3-D face image generation system as in claim 6 wherein the memory unit further comprises image data of person's faces, and the image data is correlated to the composite codes.

9. A 3-D face image generation system as in claim 8 wherein the image data is of mug shot photographs and the image data is stored locally to the facial image generation system and remotely on a centralized mug shot memory unit.

10. An image generation system comprising:
    a memory unit storing data representing an inventory of image feature shapes, wherein the image feature shapes are indexed by an image composite code, where each feature composite code identifies a particular image feature shape and each image feature has a plurality of associated feature composite codes and image feature shapes, and a group of image composite codes identifies the image feature shapes which when assembled together form the image;
    an input device for entering data to select a particular group of feature composite codes corresponding to a particular image;
    a processor operatively connected to the memory unit and input device, and an executing program instructions including instructions to access the memory unit to extract data representing the image feature shapes corresponding to the particular group of composite codes, and assembling the image feature shapes into the image, and
    a display on which the image is presented.

11. An image generation system as in claim 10 wherein the memory unit is a local storage device to the system.

12. An image generation system as in claim 10 wherein the feature composite code includes a first code that identifies an image feature part and a second code that identifies a particular image feature shape of the image feature part.

13. An image generation system as in claim 12 wherein the feature composite code is hierarchical and the first code is an upper level code, and the second code is a lower level code of the first code.

14. An image generation system as in claim 10 wherein the image feature shapes are represented as three-dimensional surface data.

15. An image generation system as in claim 10 wherein the memory unit also stores fiducial point templates corresponding to the image feature shapes, and the processor executes instructs to compare a template corresponding to fiducial points on an image entered via the input device to the fiducial point templates stored in the memory unit.

16. An image generation system as in claim 15 wherein the fiducial point templates are formed of less than fifty fiducial points on the corresponding image feature shape.

17. An image generation system as in claim 15 wherein the memory unit further comprises image data of person's faces, and the image data is correlated to the feature composite codes.

18. An image generation system as in claim 17 wherein tire image data is of mug shot photographs and the image data is stored locally to the image generation system and remotely on a centralized mug shot memory unit.

* * * * *